(12) United States Patent
Frank

(10) Patent No.: US 9,485,507 B2
(45) Date of Patent: Nov. 1, 2016

(54) EXECUTION UNITS FOR IMPLEMENTATION OF CONTEXT ADAPTIVE BINARY ARITHMETIC CODING (CABAC)

(71) Applicant: Advanced Micro Devices, Inc., Sunnyvale, CA (US)

(72) Inventor: Michael Frank, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 487 days.

(21) Appl. No.: 14/150,144

(22) Filed: Jan. 8, 2014

(65) Prior Publication Data

US 2014/0161197 A1 Jun. 12, 2014

Related U.S. Application Data

(62) Division of application No. 12/436,196, filed on May 6, 2009, now Pat. No. 8,638,850.

(51) Int. Cl.
| | |
|---|---|
| *H04N 7/12* | (2006.01) |
| *G06F 7/38* | (2006.01) |
| *H04N 19/91* | (2014.01) |
| *H04N 19/13* | (2014.01) |
| *H04N 19/64* | (2014.01) |
| *H04N 19/44* | (2014.01) |
| *H04N 19/436* | (2014.01) |

(52) U.S. Cl.
CPC ........ *H04N 19/00951* (2013.01); *H04N 19/13* (2014.11); *H04N 19/436* (2014.11); *H04N 19/44* (2014.11); *H04N 19/647* (2014.11); *H04N 19/91* (2014.11)

(58) Field of Classification Search
CPC ................. H04N 19/00951; H04N 19/00121; H04N 19/13; H04N 19/436; H04N 19/647; H04N 19/44; H04N 19/91
See application file for complete search history.

(56) References Cited

U.S. PATENT DOCUMENTS 5,909,572 A * 6/1999 Thayer ................ G06F 9/30014
712/223
7,626,518 B2 12/2009 Hussain et al.
(Continued)

FOREIGN PATENT DOCUMENTS

FR WO 2007118811 A2 * 10/2007 .......... H03M 7/4006

OTHER PUBLICATIONS

Joint Video Team; "Draft ITU-T Recommendation and Final Draft International Standard of Joint Video Specification (ITU-T Rec. H.264 | ISO/IEC 14496-10 AVC)"; May 23-27, 2003; Geneva, Switzerland (270 pages).
Detlev Marpe, Heiko Schwarz, and Thomas Wiegand; "Context-Based Adaptive Binary Arithmetic Coding in the H.264/AVC Video Compression Standard"; IEEE Transactions on Circuits and Systems for Video Technology, vol. 13, No. 7, Jul. 2003; pp. 620-636 (17 pages).

(Continued)

*Primary Examiner* — Sath V Perungavoor
*Assistant Examiner* — Xiaolan Xu
(74) *Attorney, Agent, or Firm* — Meyertons Hood Kivlin Kowert & Goetzel, P.C.; Jeffrey C. Hood; Mark K. Brightwell

(57) ABSTRACT

A digital processor for recovering a source bitstream from an encoded bitstream that has been encoded according to a context adaptive binary arithmetic coding (CABAC) algorithm. The processor includes a first execution unit and a second execution unit. The first execution unit generates first execution data by operating on a first register and a second register, and stores the first execution data in the first register. The first execution data includes a current output bit, a temporary range value and a temporary offset value. The current output bit corresponds to a bit of the source bitstream. The second execution unit generates second execution data by operating on the first register and the second register, and stores the second execution data in the second register. The second execution data includes a normalized range value and a normalized offset value.

20 Claims, 18 Drawing Sheets

(56) References Cited

U.S. PATENT DOCUMENTS

| | | |
|---|---|---|
| 7,804,903 B2 | 9/2010 | Haque et al. |
| 2008/0048893 A1* | 2/2008 | Xu ................... H03M 7/4006 |
| | | 341/60 |
| 2009/0160863 A1 | 6/2009 | Frank |
| 2009/0232205 A1* | 9/2009 | Chiba ............... H03M 7/4006 |
| | | 375/240.02 |
| 2009/0279613 A1* | 11/2009 | Suzumura ........... H04N 19/176 |
| | | 375/240.25 |

OTHER PUBLICATIONS

A. Dasu and S. Panchanathan; "A Survey of Media Processing Approaches"; IEEE Transactions on Circuits and Systems for Video Technology, pp. 633-645, vol. 12, No. 8, Aug. 2002; (13 pages).

International Search Report and Written Opinion for Application No. PCT/US2010/033744, mailed Sep. 3, 2010 (19 pages).

* cited by examiner

```
unsigned short RangeLPS, codIRange;
unsigned short tmpRange, x;
unsigned short tmpOffsetA, tmpOffsetB;
unsigned short tmpState, LZCount;
bit RangeIDX[1:0], tmpQ, binVal, mode, modeS;

// intermediate result calculation

RangeIDX = src2.Range >> 6;  // upper two bits of Range
RangeLPS = src1.rLPS[RangeIDX];  // select one of the four rLPS values
if (src1.ByPass) x = 0
else
        if (src1.Terminate) x = 2
        else x = RangeLPS;
codIRange = src2.Range - x;
tmpOffsetA = src1.ByPass ? ((src2.Offset << 1) || src2.SBuf1[0]) : (src2.Offset);
tmpOffsetB = tmpOffsetA - codIRange;
tmpQ = tmpOffsetB.Carry;  // carry from calculating tmpOffsetB
dest.NextOffset = tmpQ ? tmpOffsetA : tmpOffsetB;

mode = tmpQ || src1.Terminate || src1.ByPass;
tmpRange = mode ? codIRange : RangeLPS;
dest.NextRange = tmpRange;

modeS = src1.Terminate || src1.ByPass;
dest.MPS = ((src1.StateZ && ~tmpQ) ^ (src1.MPS));

tmpState = tmpQ ? src1.nextStateMPS : src1.nextStateLPS;
dest.CurrentState = tmpState;
dest.StateZ = (tmpState = = 0);
dest.MPSprime = src1.MPS;
binVal = modes ? (~tmpQ) : (~tmpQ ^ src1.MPS);
dest.Q = binVal;
dest.Symbol = ((src1.Symbol << 1) || binVal);

LZCount = LeadingZeroCount(tmpRange);  // count the number of leading zeros
dest.SCount = modeS ? (tmpQ && src1.Terminate) || src1.ByPass) : LZCount;

// update context state for the current context
// mem64 is a valid 64-bit aligned memory address, MemLoad = Memory[ mem64 + (tmpState * 8) ];
dest.nextStateLPS = MemLoad.nextStateLPS;
dest.nextStateMPS = MemLoad.nextStateMPS;
dest.Terminate = MemLoad.Terminate;
dest.ByPass = MemLoad.ByPass;
dest.rLPS[3:0] = MemLoad.rLPS[3:0];
```

FIG. 19

```
unsigned short tmpBitsLeft, tmpLcnt, tmpAdd;
unsigned long tmpVal, tmpBuf, tmpBuf2;
bit tmpGet;

// intermediate result calculation tmpBitsLeft = src1.BitsLeft – src2.Scount;
tmpGet = (tmpBitsLeft < 1);
dest.GetBits = tmpGet; // may be used to set flag in GPR version tmpAdd = tmpGet ? 32 : 0;
dest.BitsLeft = tmpBitsLeft + tmpAdd;

dest.Range = src2.NextRange << src2.SCount;
dest.ShCnt = src2.Scount;

tmpLcnt = src2.Scount – src1.BitsLeft; // yes, this is -tmpBitsLeft
tmpLS = tmpGet ? tmpLcnt: 0;
tmpBuf = src1.buf2 << tmpLS;
tmpBuf2 = tmpGet ? (tmpBuf) : (0);

dest.SBuf2 = tmpGet ? tmpBuf2[31:0] : 0;

tmpVal = (bitreverse(src2.NextOffset) | | (srcl.SBuf1 << 9) >> src2.SCount;
dest.SBuf1 = (tmpVal + tmpBuf2) >> 9;
dest.Offset = (tmpVal + tmpBuf2) & 0x1FF;
```

*FIG. 20*

EXECUTION UNITS FOR IMPLEMENTATION OF CONTEXT ADAPTIVE BINARY ARITHMETIC CODING (CABAC)

PRIORITY CLAIM DATA

This application is a divisional of U.S. patent application Ser. No. 12/436,196 (USPTO Publication No. 2010/0284456), filed on May 6, 2009, entitled "Execution Units for Context Adaptive Binary Arithmetic Coding (CABAC)", invented by Michael Frank, which is hereby incorporated by reference in its entirety as though fully and completely set forth herein.

FIELD OF THE INVENTION

The present invention relates to the field of data compression, and more particularly, to mechanisms for performing encoding and/or decoding according to the context-adaptive binary arithmetic coding (CABAC) algorithm.

DESCRIPTION OF THE RELATED ART

Digital video encoding and decoding has become an important part of the workload for modern processors. Software based video decoding for MPEG2 at standard TV resolution (SD) has been around for almost 10 years, and HW acceleration for highly parallelizable parts of the decoding algorithm has been implemented in diverse graphic accelerators. With the introduction of more sophisticated video compression algorithms (MPEG4 and MPEG4/AVC, also known as H.264) and even more so with the transition from SD to high-definition (HD) video streams, performance requirements for SW decoders have increased dramatically. (AVC is an acronym for "Advanced Video Coding".) High definition video encoding (H.264) and JPEG2000 (now used for digital cinema) use arithmetic coding to losslessly reduce the data rate of the token stream generated by the lossy compression at the front end. Using arithmetic encoding is known in the art to be optimal if the probability density function (PDF) of the encoded symbol stream is known. H.264 uses a variant of arithmetic coding, i.e., context-adaptive binary arithmetic coding (CABAC), that models the PDF (using a complex state machine) as a function of the current encoding context. Evaluating the incoming bitstream at high data rates and updating the context state is creating a huge processing load for current CPUs and consumes a significant part of the performance of a processor core (e.g., greater than 50%). Thus, there exists a need for CPUs capable of performing the operations associated with CABAC encoding and/or decoding with increased efficiency.

SUMMARY

In one set of embodiments, a digital processor may be configured for decoding an input bitstream that has been encoded according to a context adaptive binary arithmetic coding (CABAC) algorithm. The processor may include a first execution unit, a second execution unit and a distribution unit.

The distribution unit may be coupled to the first execution unit and the second execution unit, and configured to fetch a stream of instructions, where the stream of instructions includes a first instruction and a second instruction. The distribution unit may be configured to: decode the first instruction and the second instruction; schedule execution of the decoded first instruction on the first decode unit; and schedule execution of the decoded second instruction on the second decode unit.

In response to the distribution unit's scheduling of execution of the decoded first instruction, the first execution unit may be configured to generate a current output bit, a temporary range value and a temporary offset value based at least on a current range value and a current offset value. The current offset value includes one or more bits of the input bitstream.

In response to the distribution unit's scheduling of execution of the decoded second instruction, the second execution unit may be configured to generate an update for the current range value and an update for the current offset value by normalizing respectively the temporary range value and the temporary offset value.

In some embodiments, the first execution unit is configured to operate on data fields in a first register and data fields in a second register. The data fields in the first register include a binary most-probable-symbol (MPS) value, two next probability state values, and a set of least-probable-symbol (LPS) range values. The data fields in the second register include the current range value and the current offset value. The first register may include additional data fields that are used to pass intermediate results from the first execution unit to the second execution unit, where the intermediate results include the temporary range value and the temporary offset value.

In addition, the first execution unit may be configured to generate a count of a number of leading zeros in the temporary range value. The leading zero count may be included as one of the intermediate results. The second execution unit may include a first bit shifting unit configured to normalize the temporary range value by shifting the temporary range value based on the leading zero count.

In some embodiments, the first execution unit may include a first multiplexer, a second multiplexer and a subtraction unit. The first multiplexer may be configured to select one of the LPS range values as a temporary LPS range value, based on a selection index that is determined by the current range value. The second multiplexer may be configured to generate a data value by selecting one of the constant zero, the constant two or the temporary LPS range value based on control information provided in the first register, wherein the control information includes a bypass mode control bit and a terminate mode control bit. The subtraction unit may be configured to compute an intermediate range value from the current range value and the data value.

In some embodiments, the first execution unit may be configured to access memory to obtain updated context state information and to store the updated context state information in the second register.

In one set of embodiments, a method for performing CABAC decoding may involve the following actions. First, the method may involve executing a first instruction on a first execution unit of a microprocessor. The action of executing the first instruction may include generating a current output bit, a temporary range value and a temporary offset value based at least on a current range value and a current offset value, where the current offset value includes one or more bits of the input bitstream. The method may also involve executing a second instruction on a second execution unit of the microprocessor. The action of executing the second instruction may include generating an update for the current range value and an update for the current offset value by normalizing respectively the temporary range value and the temporary offset value.

BRIEF DESCRIPTION OF THE DRAWINGS

A better understanding of the present invention can be obtained when the following detailed description of the preferred embodiments is considered in conjunction with the following drawings.

FIG. 19 is pseudo code illustrating the operations performed by execution unit 120 according to one embodiment.

FIG. 20 is pseudo code illustrating the operations performed by execution unit 130 according to one embodiment.

Figure 1:
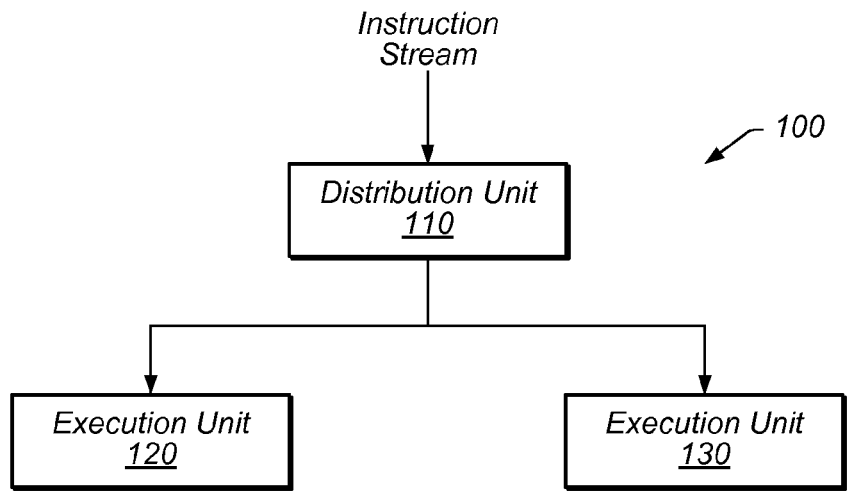
FIG. 1 illustrates one embodiment of a processor according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Context adaptive binary arithmetic coding (CABAC) is a form of entropy coding that is used in the H.264 video compression standard. CABAC relies on context-adaptive models of the processed bitstream in combination with simple arithmetic operations. CABAC, as specified by the H.264 standard, requires a collection of 399 contexts. Each of the contexts stores information regarding the state of a corresponding finite state machine (FSM). It should be noted, however, that the principles of the present invention naturally generalize to any number of contexts.

In one set of embodiments, a processor (e.g., a CPU) may be configured to support software decoding and encoding according to the CABAC algorithm. Specifically, the processor may support specialized instructions that understand, interpret and concurrently update the complex state of the CABAC state machine. The lossless entropy encoding/decoding step in the H.264 video standard has been identified as being a significant bottleneck in the CABAC algorithm. The CABAC algorithm achieves very good compression but is essentially a serial algorithm that produces one bit of the data stream at a time.

In some embodiments, a digital processor 100 (e.g., a microprocessor) may be configured as shown in FIG. 1 for decoding an input bitstream. The input bitstream is assumed to have been encoded according to a context adaptive binary arithmetic coding (CABAC) algorithm. The processor 100 may include a distribution unit 110, an execution unit 120 and an execution unit 130.

The distribution unit 110 may be coupled to the execution units 120 and 130, and configured to fetch a stream of instructions from memory. The stream of instructions includes instructions $J_1$ and $J_2$, to be described below. The distribution unit may be further configured to: decode the instructions $J_1$ and $J_2$ to respectively generate decode results $R_1$ and $R_2$; schedule execution of the decode results $R_1$ on the execution unit 120; and schedule execution of the decode results $R_2$ on the execution unit 130.

In response to the distribution unit's action of scheduling execution of the decode result $R_1$, the execution unit 120 may be configured to generate a current output bit (binVal), a temporary range value (tmpRange) and a temporary offset value (tmpOffset), based at least on a current range value (Range) and a current offset value (Offset). The current offset value may include one or more bits of the input bitstream. The current output bit represents the current result of the CABAC decoding algorithm.

In response to the distribution unit's action of scheduling execution of the decode result $R_2$, the execution unit 130 may be configured to generate an update for the current range value (Range) and an update for the current offset value (Offset) by normalizing the temporary range value (tmpRange) and the temporary offset value (tmpOffset), respectively.

Figures 2A, 2B:
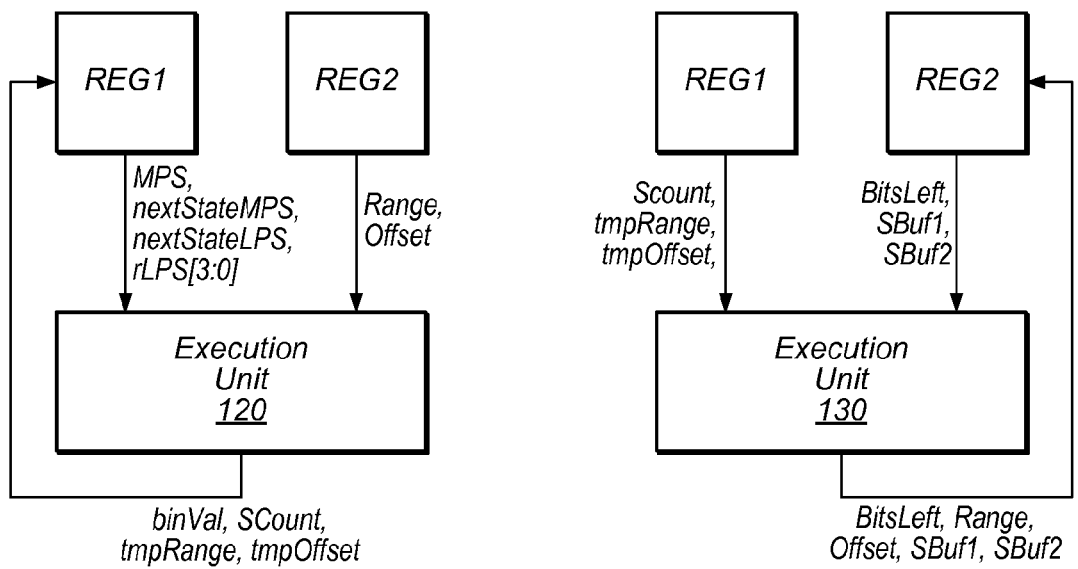
FIG. 2A illustrates one embodiment of the data flow in and out of the execution unit 120.
FIG. 2B illustrates one embodiment of the data flow in and out of the execution unit 130.

In some embodiments, the execution unit 120 may be configured to operate on data fields in a first register REG1 and data fields in a second register REG2, e.g., as shown in FIG. 2A. See also FIG. 3 for an illustration of one embodiment of registers REG1 and REG2. The data fields in the first register REG1 may include a binary most-probable-symbol (MPS) value, two next probability state values (nextStateMPS and nextStateLPS), and a set of least-probable-symbol range values (e.g., an array rLPS[3:0] containing four values). The data fields in the second register REG2 may include the current range value (Range) and the current offset value (Offset).

The first register REG1 may also include additional data fields that are used to pass intermediate results from the execution unit 120 to the execution unit 130. (The intermediate results are also referred to herein as "shared state".)

Figure 3:
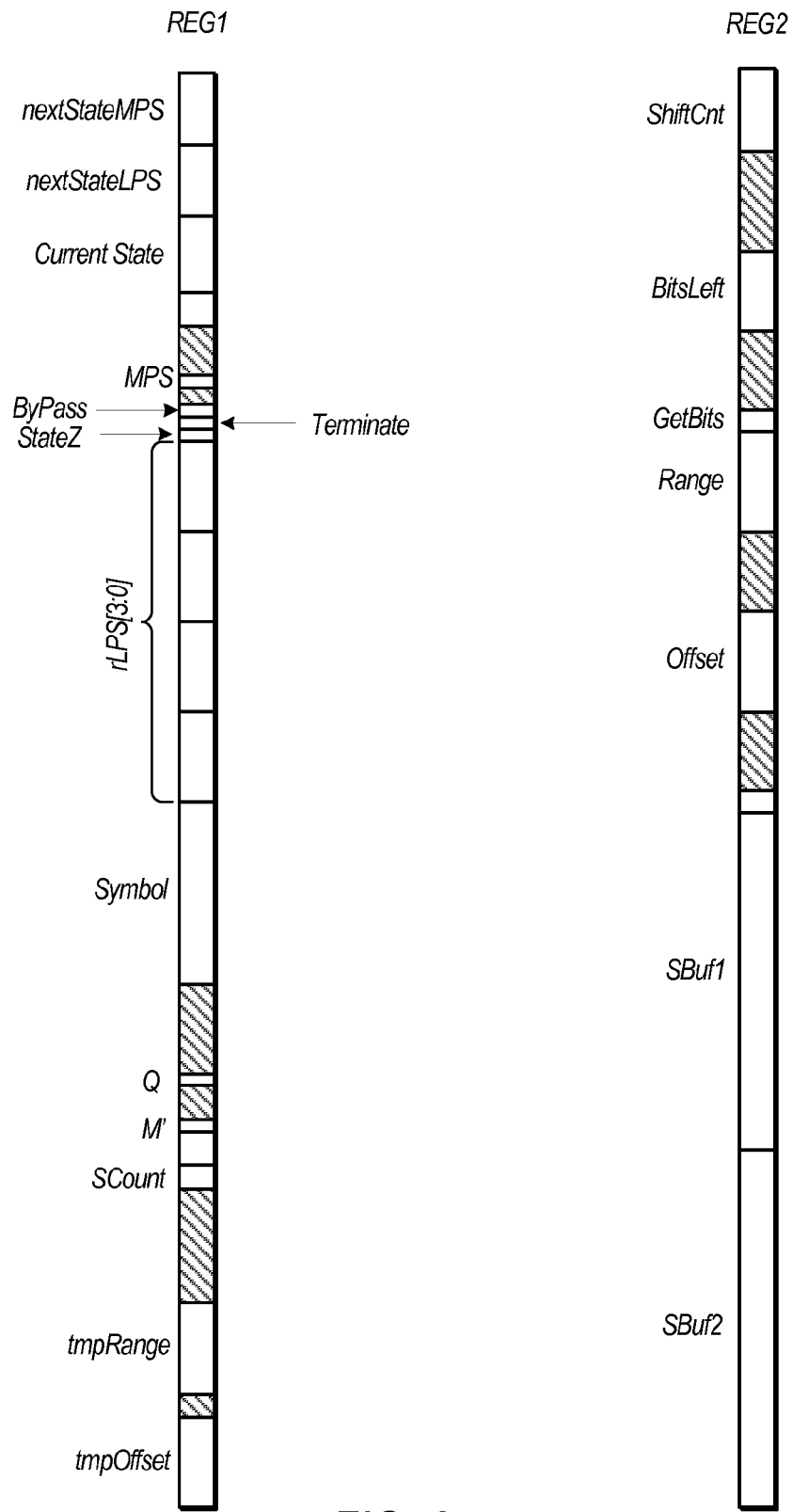
FIG. 3 illustrates one embodiment of the data items contained in registers REG1 and REG2.

The intermediate results may include the temporary range value (tmpRange) and the temporary offset value (tmpOffset). In FIG. 3, the data field corresponding to the temporary range value (tmpRange) is denoted "NextRange" to suggest that it will be used in the next processing stage, i.e., by execution unit 130. Similarly, the data field corresponding to the temporary offset value (tmpOffset) is denoted "NextOffset".

The execution unit 130 may be configured to operate on the intermediate results in the first register REG1 and on data fields in the second register REG2, and to generate results that are stored into the second register REG2, e.g., as illustrated in FIG. 2B.

The processor 100 may include an architected set of registers specialized for SIMD instructions. (SIMD is an acronym for "simultaneous instruction multiple data".) The registers REG1 and REG2 may be any two of the registers from the architected set, e.g., two registers specified by a current program instruction. In one embodiment, the architected set of registers is the set of 128-bit xmm registers as defined by the x86 instruction set.

Figure 4A:
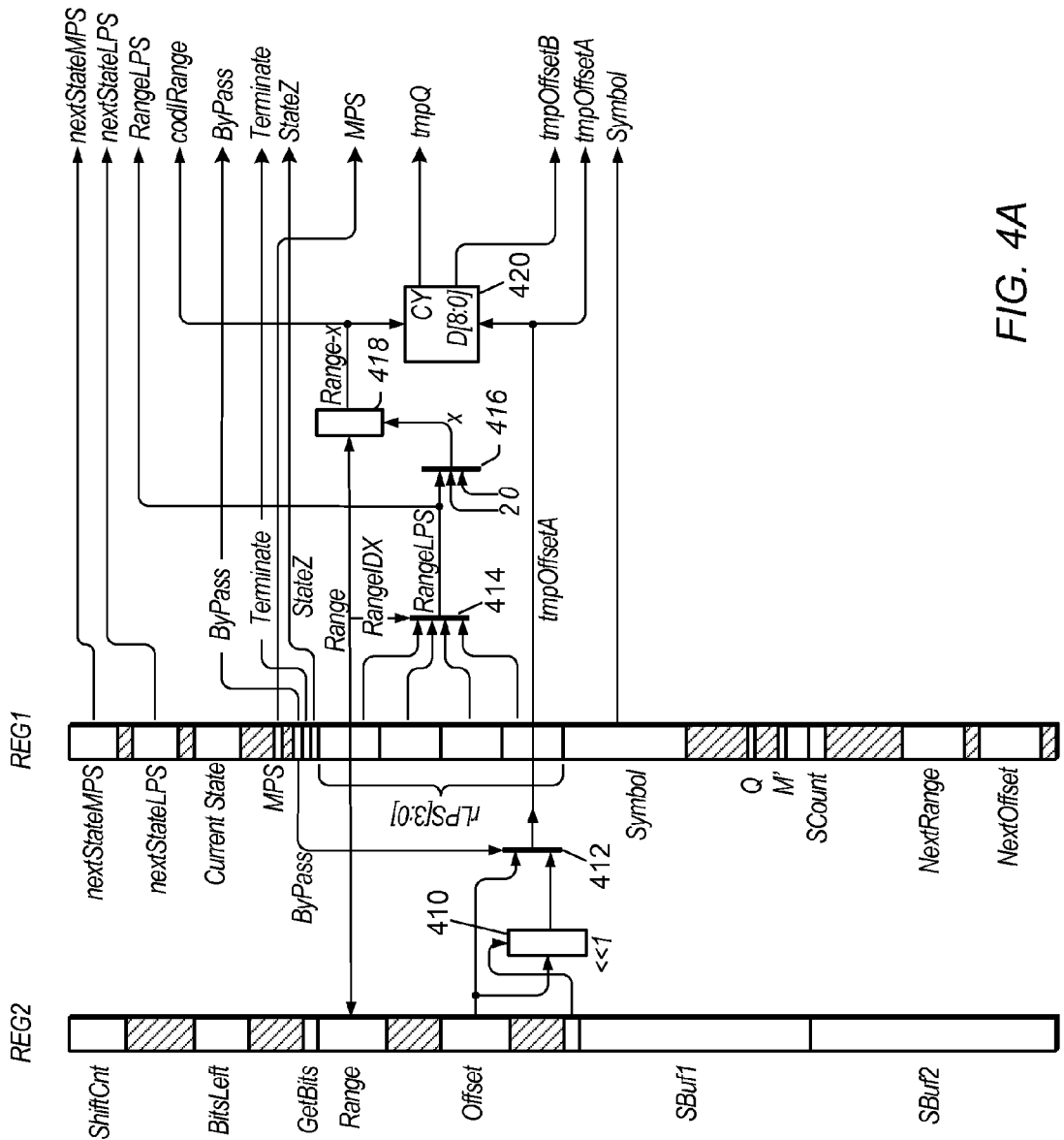
FIGS. 4A and 4B illustrates one embodiment of execution unit 120.
Figure 4B:
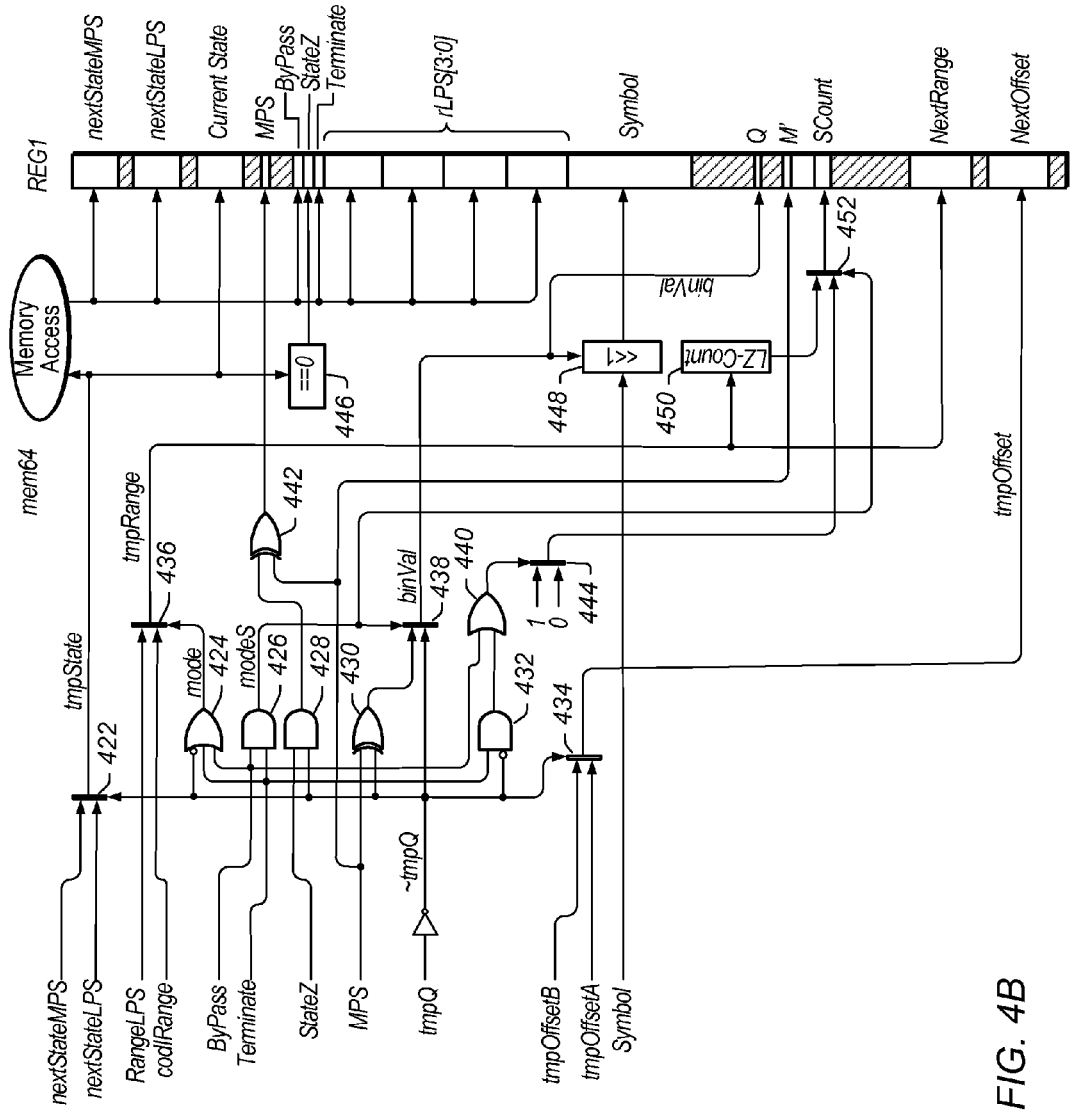
Figure 5:
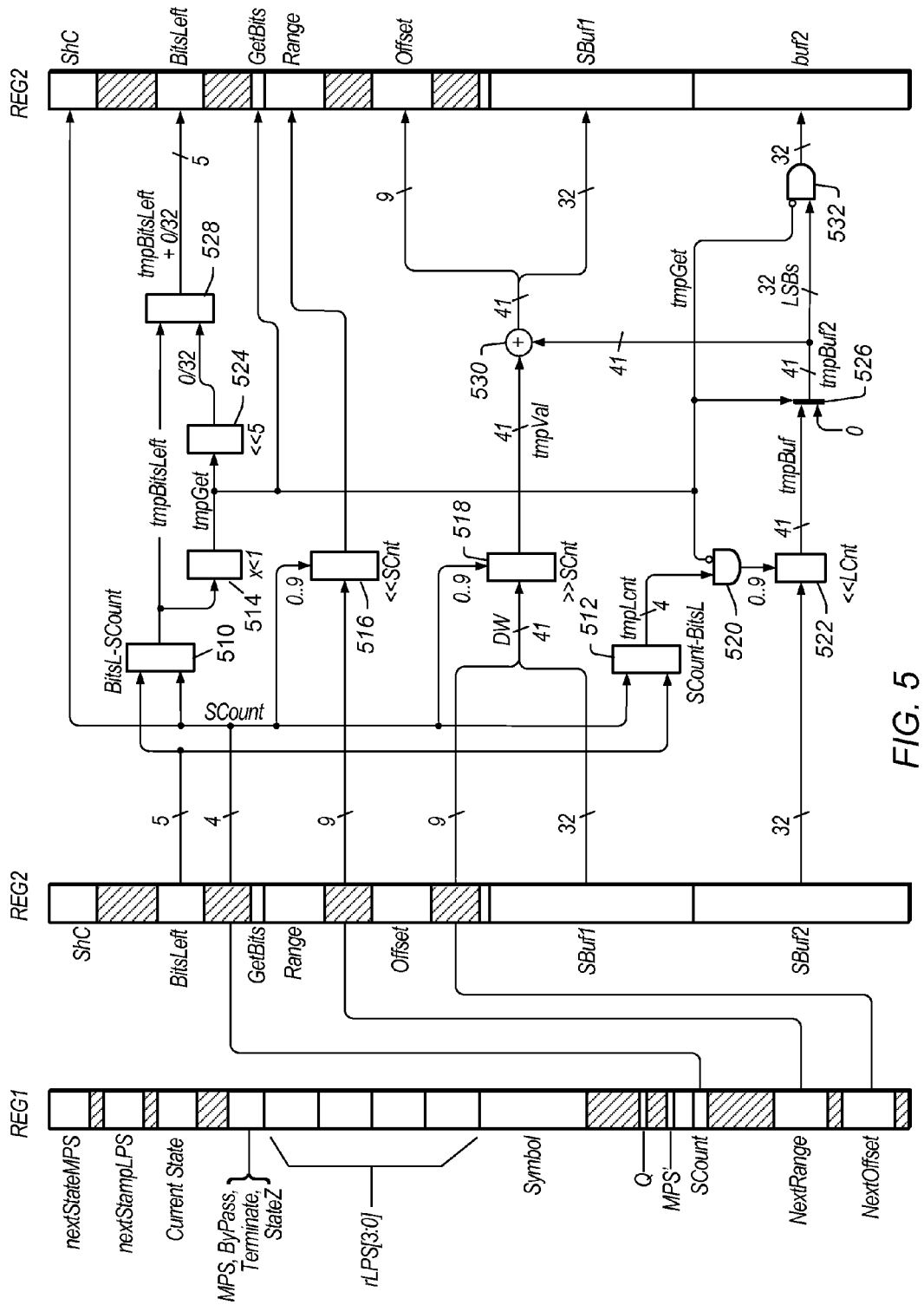
FIG. 5 illustrates one embodiments of execution unit 130.

FIGS. 4A and 4B illustrate one embodiment of execution unit 120. FIG. 5 illustrates one embodiment of execution unit 130.

The execution unit 120 may be configured to generate a count of the number of leading zeros in the temporary range value, e.g., as illustrated by units 432, 440, 444, 450 and 452 of FIG. 4B. The leading zero count (denoted by the variable SCount) may be stored in the first register REG1 as one of the intermediate results.

The execution unit 130 may include a first bit shifting unit configured to normalize the temporary range value (tmpRange) by shifting the temporary range value based on the leading zero count. For example, FIG. 5 shows execution unit 130 as including a shift unit 516 to serve that normalization function.

In some embodiments, the execution unit 120 may include a multiplexer 414, a multiplexer 416 and a subtraction unit 418 as shown in FIG. 4A. The multiplexer 414 may be configured to select one of the LPS range values as a temporary LPS range value (RangeLPS) based on a selection index (RangeIDX) that is determined from the current range value (Range). For example, in one embodiment, the selection index is the two most significant bits of the current range value. The multiplexer 416 may be configured to generate a data value x by selecting one of the constant zero, the constant two or the temporary LPS range value based on control information provided in the first register REG1. The control information may include a bypass mode control bit (ByPass) and a terminate mode control bit (Terminate). The subtraction unit 418 may be configured to compute an intermediate range value (codIRange) from the current range value (Range) and the data value x.

Figure 6:
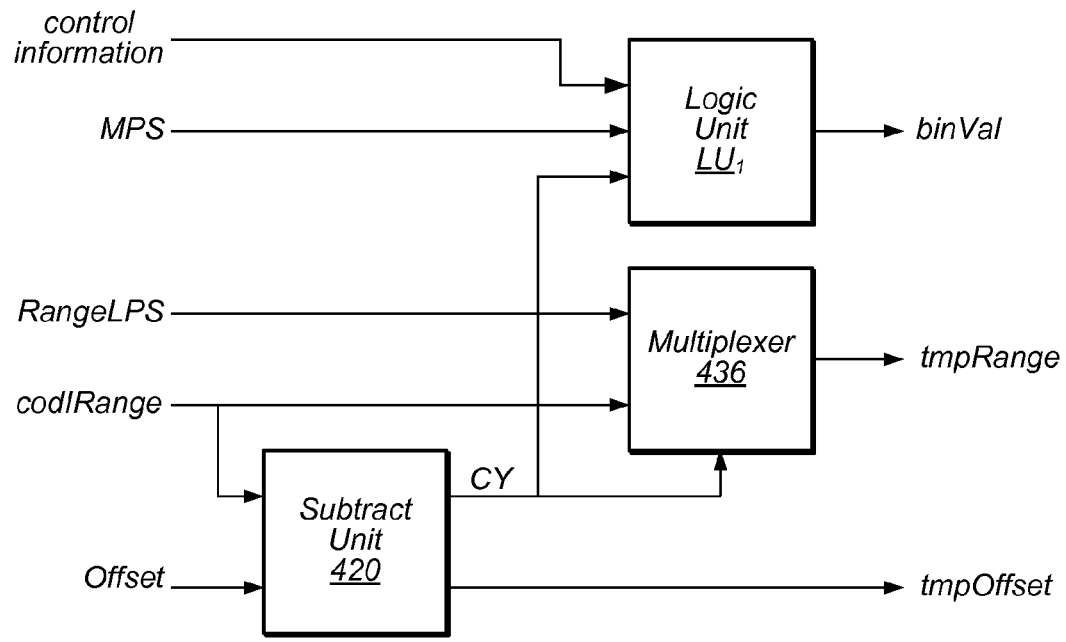
FIG. 6 illustrates one embodiment of circuitry for computing the current output value (binVal), the temporary range value (tmpRange) and the temporary offset value (tmpOffset).

In some embodiments, the execution unit 120 includes a subtraction unit 420, a logic unit $LU_1$ and a multiplexer 436 as shown in FIG. 6. (FIGS. 4A and 4B illustrate one such embodiment, where the logic unit $LU_1$ is realized by units 426, 430 and 438.) The subtraction unit 420 may be configured to compute the temporary offset value (tmpOffset) by subtracting the intermediate range value (codIRange) from the current offset value (Offset). The intermediate range value equals an MPS range value (RangeMPS) in a normal decoding mode, equals the current range value (Range) in a bypass mode, and equals the current range value minus two in a terminate mode. The logic unit $LU_1$ may be configured to generate the current output bit (binVal) based on the MPS value, on control information provided in the first register REG1, and on a carry output bit (CY) of the subtraction unit 420. The current output bit represents a current result of the CABAC decoding algorithm. The multiplexer 436 may be configured to generate the temporary range value (tmpRange) by selecting either the intermediate range value (codIRange) or a temporary LPS range value (RangeLPS) based at least on the carry output bit (CY) of the subtraction unit 420. In some embodiments, additional logic intervenes between the carry output CY of the subtraction unit 420 and the select input of the multiplexer 436.

In some embodiments, the execution unit 120 includes a subtraction unit 420 and a multiplexer 422 as shown in FIGS. 4A and 4B. The subtraction unit 420 may be configured to compute the temporary offset value (tmpOffset) from the current offset value (Offset) and an intermediate range value (codIRange). The intermediate range value (codIRange) equals an MPS range value (RangeMPS) in a normal decoding mode, equals the current range value (Range) in a bypass mode, and equals the current range value minus two in a terminate mode. The multiplexer 422 may be configured to generate a current probability state value (tmpState) by selecting one of the two next probability state values (nextStateMPS or nextStateLPS) based on a carry output bit (CY) of the subtraction unit 420. The execution unit 120 may be configured to generate updates for the two next probability state values and the set of LPS range values (rLPS[3:0]) by accessing memory using an address that is based on the current probability state value (tmpState). The current probability state value may be stored in the CurrentState field of the register REG1.

In some embodiments, the second register REG2 may also include a buffer count value (BitsLeft), a first stream buffer (SBuf1) and a second stream buffer (SBuf2) as shown in FIGS. 3 and 5. The first and second stream buffers store bits of the input bitstream. The buffer count value (BitsLeft) indicates the number of valid bits remaining in the first stream buffer (SBuf1). The execution unit 130 may include a bit shift unit 518 and a bit shift unit 522 as shown in FIG. 5. The bit shift unit 518 may be configured to shift a data word DW based on the leading zero count (SCount) to generate a shifted data word (tmpVal). The data word DW may be a concatenation of the contents of the first stream buffer (SBuf1) and the temporary offset value (tmpOffset). The bit shift unit 522 may be configured to shift contents of the second stream buffer (SBuf2) based on a shift control value (LCount) to generate a temporary buffer value (tmpBuf).

In some embodiments, the execution unit 130 includes a multiplexer 526 and an adder 530 as shown in FIG. 5. The multiplexer 526 may be configured to generate a second temporary buffer value (tmpBuf2) by selecting the temporary buffer value (tmpBuf) or the constant zero based on a control signal (tmpGet) that indicates whether the buffer count value (BitsLeft) is less than or equal to the leading zero count (SCount). The adder 530 may be configured to generate an output data word by adding the shifted data word (tmpVal) and the second temporary buffer value (tmpBuf2). The output data word includes a first portion that specifies the update for the current offset value (Offset) and a second portion that specifies an update for the first stream buffer (SBuf1).

In some embodiments, the instruction $J_1$ (referred to above) may include information identifying the registers REG1 and REG2 from a set of architected registers in the digital processor. For example, the identifying information may identify the first register REG1 as both a source and destination operand for the instruction $J_1$, and identify the second register REG2 as an additional source operand for the instruction $J_1$. The instruction $J_1$ may also includes a memory address that points to a table stored in memory. The table will be described in more detailed below.

Furthermore, the instruction $J_2$ (referred to above) may include information identifying the registers REG1 and REG2 from the set of architected registers. For example, the identifying information may identify the second register REG2 as a source and destination operand for the second instruction $J_2$, and identify the first register REG1 as an additional source operand for the second instruction $J_2$.

Figure 7:
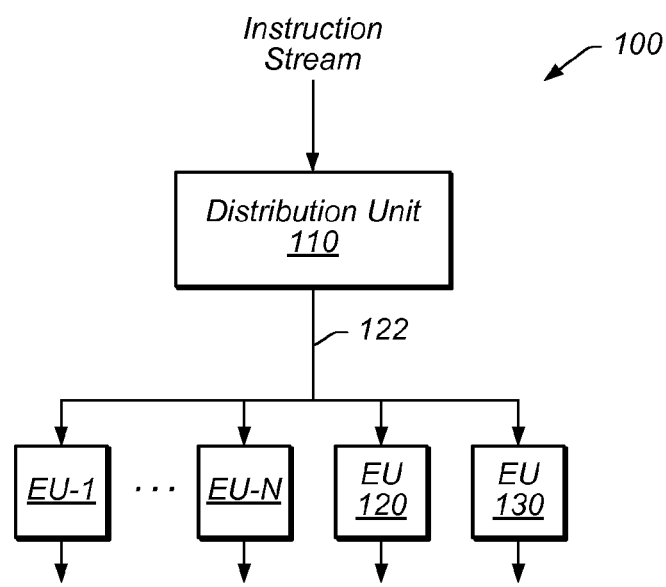
FIG. 7 illustrates one embodiment of processor 100, includes execution units EU-1 through EU-N.

In some embodiments, the instruction stream received by the distribution unit 110 also includes instructions from a baseline instruction set B in addition to the instructions $J_1$ and $J_2$. Accordingly, the processor 100 may also include a set of execution units EU-1, EU-2, . . . , EU-N configured for executing the instructions of the baseline instruction set, as shown in FIG. 7. The distribution unit 110 may be configured to decode instructions of the baseline instruction set and schedule execution of the decoded baseline instructions on the execution units EU-1 through EU-N.

As used herein, the term "baseline instruction set" is any instruction set that includes at least a set of general-purpose processing instructions such as instructions for performing integer and floating-point arithmetic, logic operations, bit manipulation, branching and memory access. A "baseline instruction set" may also include other instructions, e.g., instructions for performing simultaneous-instruction multiple-data (SIMD) operations on integer vectors and/or on floating point vectors.

In some embodiments, the baseline instruction set may include an x86 instruction set such as the IA-32 instruction set from Intel or the AMD-64™ instruction set defined by AMD. In other embodiments, the baseline instruction set may include the instruction set of a processor such as a MIPS processor, a SPARC processor, an ARM processor, a PowerPC processor, etc. The baseline instruction set may be defined in an instruction set architecture.

Figure 8:
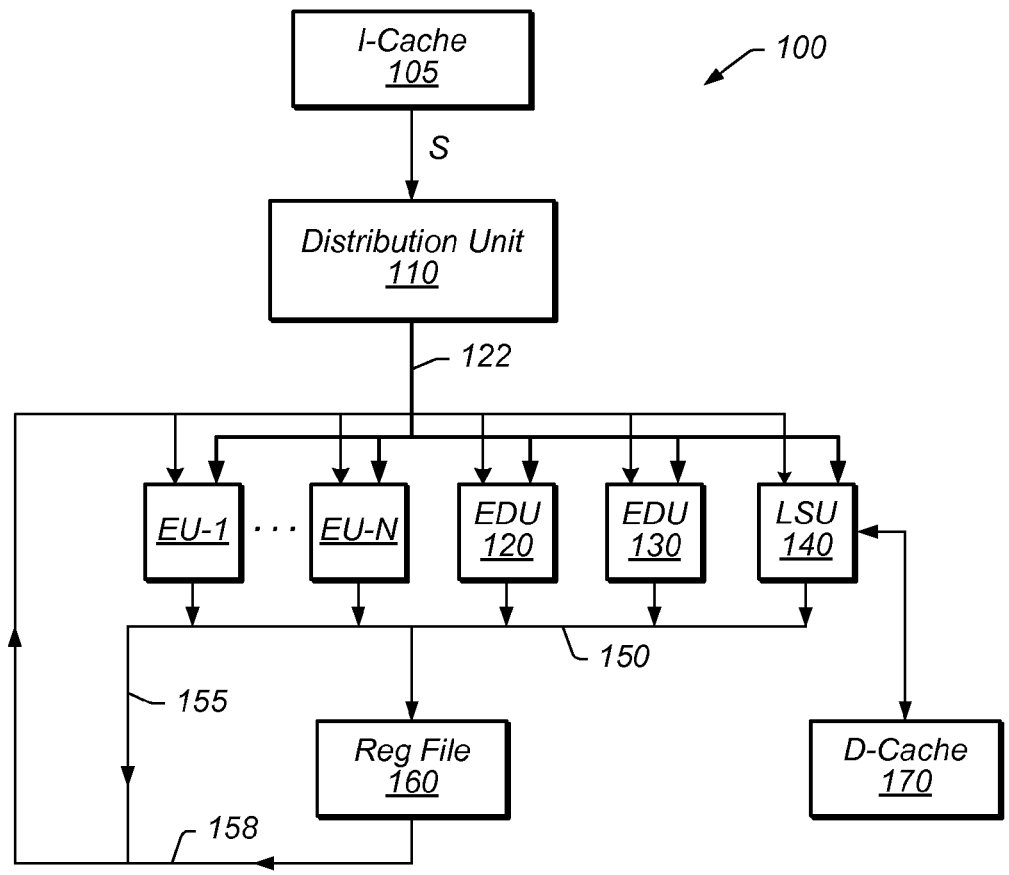
FIG. 8 illustrates another embodiment of processor 100, i.e., a refinement of the embodiment shown in FIG. 7.

FIG. 8 illustrates one embodiment of the processor 100. In addition to the units shown in FIG. 7, this embodiment includes an instruction cache 105, a load/store unit 140, a register file 160 and a data cache 170.

The instruction cache 105 may store copies of instructions that have been recently accessed from system memory. (System memory resides external to processor 100.) The distribution unit 110 may fetch the stream S of instructions from the instruction cache 105. The stream S includes instructions drawn from the baseline instruction set (as described above) and from an extension set. The extension set includes the instructions J1 and J2, as described above.

Figure 9:
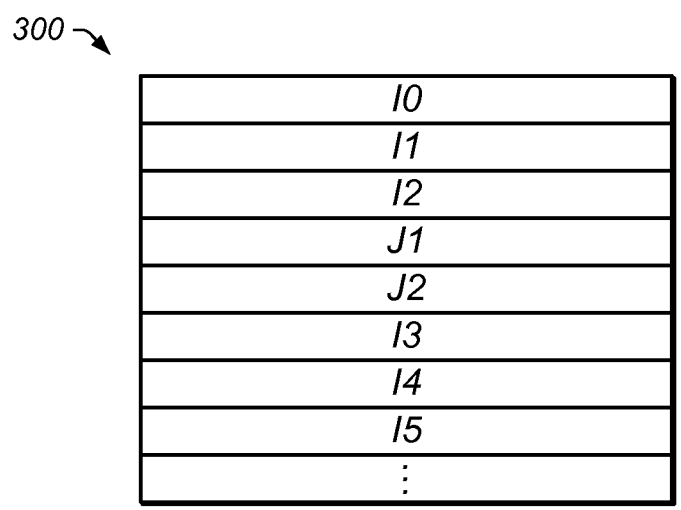
FIG. 9 illustrates an example instruction stream that may be supplied to processor 100 at least in some embodiments.

The programmer has the freedom to intermix instructions of the baseline instruction set and the extension set when building a program for processor 100. An example of this mixing of instructions is shown in FIG. 9. Example stream 300 includes instructions I0, I1, I2, I3, I4, I5, . . . from the baseline instruction set, and instructions J1 and J2 from the extension set. While the example stream 300 shows one occurrence of the pair $J_1$ and $J_2$, that instruction pair may occur any number of times. For example, a long video stream may involve many occurrences of the pair $J_1$ and $J_2$.

The distribution unit 110 may decode the stream of fetched instructions into executable operations (ops). Each fetched instruction may be decoded into one or more ops. Some of the fetched instructions (e.g., some of the more complex instructions) may be decoded by accessing a microcode ROM. Furthermore, some of the fetched instructions may be decoded in a one-to-one fashion, i.e., so that the instruction results in a single op that is unique to that instruction.

The distribution unit 110 may schedule the ops for execution on the execution units that include: execution units 120 and 130, execution units EU-1 through EU-N, and load/store unit 140. The one or more ops ($R_1$) that result from decoding the instruction $J_1$ are scheduled for execution on execution unit 120, and the one or more ops ($R_2$) that result from decoding the instruction $J_2$ are scheduled for execution on execution unit 130.

As noted above, the distribution unit 110 may decode each instruction of the stream S of fetched instructions into one or more ops and schedule the one or more ops for execution on appropriate ones of the executions units. In some embodiments, the distribution unit 110 may be configured for superscalar operation, out-of-order (OOO) execution, multi-threaded execution, speculative execution, branch prediction, or any combination thereof. Thus, in various embodiments, distribution unit 110 may include various combinations of: logic for determining the availability of the execution units; logic for dispatching two or more ops in parallel (in a given clock cycle) whenever two or more execution units capable of handling those ops are available; logic for scheduling the out-of-order execution of ops and guaranteeing the in-order retirement of ops; logic for performing context switching between multiple threads and/or multiple-processes; etc.

Load/store unit 140 may couple to a data cache 170 and may be configured to perform memory write and memory read operations. For a memory write operation, the load/store unit 140 may generate a physical address and the associated write data. The physical address and write data may be entered into a store queue (not shown) for later transmission to the data cache 170. Data read from memory may be supplied to load/store unit 140 from data cache 170 (or from an entry in the store queue in the case of a recent store).

Execution units EU-1 through EU-N may include one or more integer pipelines and one or more floating-point units. The one or more integer pipelines may include resources for performing integer operations (such as add, subtract, negate, multiply and divide), logic operations (such as AND, OR and XOR), and bit manipulation (such as shift and cyclic shift). In some embodiments, resources of the one or more integer pipelines are configured to perform SIMD integer operations. The one or more floating-point units may include resources for performing floating-point operations. In some embodiments, the resources of the one or more floating-point units are configured to perform SIMD floating-point operations.

In one set of embodiments, the execution units EU-1 through EU-N may include one or more SIMD units configured for performing integer and/or floating point SIMD operations.

As illustrated by FIG. 8, the execution units may couple to a dispatch bus 122 and a results bus 150. The execution units receive ops from the distribution unit 110 via the dispatch bus 122, and pass the results of execution to register file 160 via results bus 150. The register file 160 couples to feedback path 158, which allows data from the register file 160 to be supplied as source operands to the execution units. Bypass path 155 couples between results bus 150 and the feedback path, allowing the results of execution to bypass the register file 160, and thus, to be supplied as source operands to the execution units more directly. Register file 160 may include physical storage for a set of architected registers.

As noted above, the execution units EU-1 through EU-N may include one or more floating-point units. Each floating-point unit may be configured to execute floating-point instructions (e.g., x87 floating-point instructions, or floating-point instructions compliant with IEEE 754/854). Each floating-point unit may include an adder unit, a multiplier unit, a divide/square-root unit, etc. Each floating-point unit may operate in a coprocessor-like fashion, in which case the distribution unit 110 directly dispatches the floating-point instructions to the floating-point unit. The floating-point unit may include storage for a set of floating-point registers (not shown).

In some embodiments, the processor 100 may be included in a computer system such as a personal computer (in any of its various forms), a server computer, a client computer, a mobile device, a digital television, a set-top box, etc. The processor 100 may be implemented in terms of one or more integrated circuits.

Figure 10:
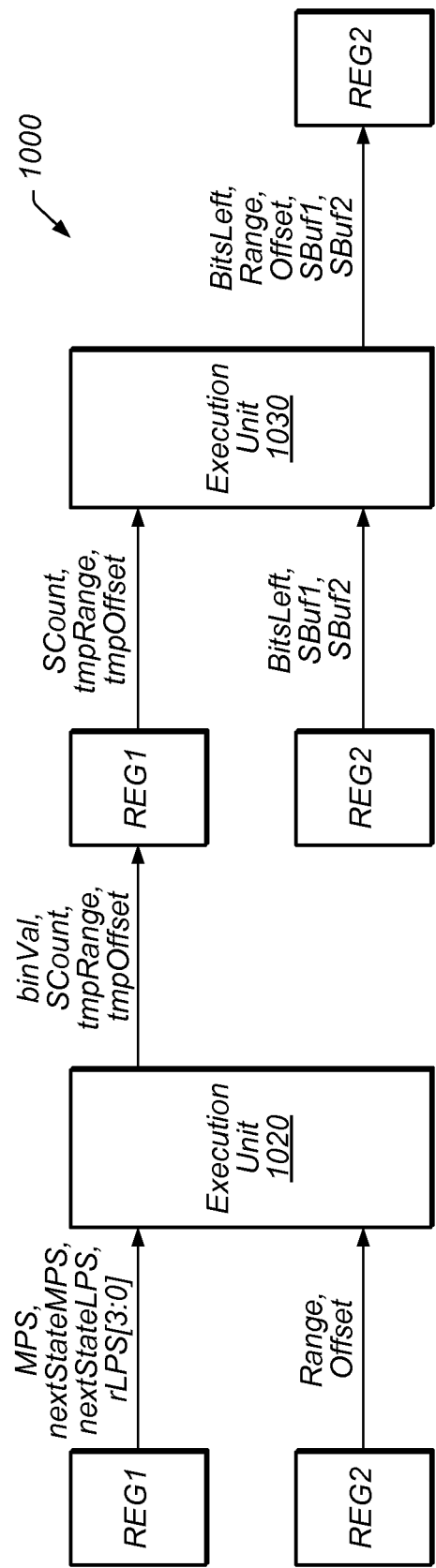
FIG. 10 illustrates one embodiment of a processor 1000 that uses two registers (REG1 and REG2).

In one set of embodiments, a digital processor 1000 for recovering a source bitstream from a CABAC encoded bitstream may be configured as shown in FIG. 10. The processor 1000 may include an execution unit 1020 and an execution unit 1030. One embodiment of execution unit 1020 is shown in FIGS. 4A and 4B, and one embodiment of execution unit 1030 is shown in FIG. 5.

The execution unit 1020 may be configured to generate execution data by operating on a first register REG1 and a second register REG2, and to store the execution data in the first register REG1. (The two occurrences of the first register REG1 shown in FIG. 10 are for diagrammatic simplicity, not to imply that the first register is duplicated in hardware. Similarly, the three occurrences of the second register REG2 are for diagrammatic simplicity.) The execution data may include a current output bit (binVal), a temporary range value (tmpRange) and a temporary offset value (tmpOffset), where the current output bit corresponds to a bit of the source bitstream.

The execution unit 1030 may be configured to generate second execution data by operating on the first register REG1 and the second register REG2 and to store the second execution data in the second register REG2. The second execution data includes a normalized range value (Range) and a normalized offset value (Offset).

The first register REG1 may include data fields for storing the current output bit (binVal), the temporary range value (tmpRange), the temporary offset value (tmpOffset), a binary most-probable-symbol (MPS) value, a current probability state (CurrentState), two next probability state values (nextStateMPS and nextStateLPS), and a set of least-probable-symbol (LPS) range values, e.g., as shown in FIG. 3. The first register REG1 may also include data fields for storing a bypass control bit, a termination control bit and a zero state indicator. The bypass control bit indicates whether a bypass mode is selected. The termination control bit indicates whether a terminate mode is selected. The zero state indicator indicates whether the probability state index of the current context is equal to zero.

In some embodiments, the execution data generated by the execution unit 1020 also includes an update for the current probability state (CurrentState) and an update for the MPS value. Furthermore, the execution unit 1020 may be configured to initiate a memory access and to store results of the memory access in the first register REG1. The results of the memory access may include updates for the two next probability state values and for the set of LPS range values.

The processor 1000 may include additional execution units configured to execute instructions of a baseline instruction set, e.g., as described above and/or as shown in FIG. 8. In one embodiment, the baseline instruction set includes a set of integer arithmetic operations and a set of floating point arithmetic operations.

In some embodiments, the second register REG2 includes data fields for storing a first stream buffer (SBuf1), the normalized range value (Range) and the normalized offset value (Offset), e.g., as shown in FIG. 3. The first stream buffer (SBuf1) stores bits of the encoded bit stream. Furthermore, the execution unit 1030 may be configured to extract a number of bits from the first stream buffer (SBuf1), and to generate the normalized offset value by left shifting the temporary offset value (tmpVal) and injecting the extracted bits into the LSB positions vacated by the left shifting.

The second register REG2 may also include a remaining bit count (BitsLeft) that indicates a number of valid bits remaining in the first stream buffer (SBuf1).

In one set of embodiments, a processor such as processor 100 or processor 1000 may be configured based on a reorganization of the complex state of the CABAC decoding process so that part of the state is stored within two registers (e.g., wide registers such as the 128-bit wide xmm registers). This state may be manipulated using the instructions J1 and J2 as described herein. The instructions $J_1$ and $J_2$ may interact with each other by communicating intermediate state via predefined locations within a register so that the repeated execution of the instruction pair $\{J_1, J_2\}$ decodes at least one bit of data per iteration. The processor may in some embodiments be configured according to a global storage organization for the context state that enables the processor to load the entire context state into one of the registers in a single memory access and store the updated context state into memory in a single memory access whenever a context change is required.

In some embodiments, the processor may be configured to support multi-tasking. Thus, two or more streams of CABAC data may be decoded in parallel (or apparently in parallel from the point of view of the user/users). The mechanisms for saving state on task switches are well understood and supported by any of various operating systems.

In some embodiments, the processor includes two or more independent cores, where each core includes logic for executing the instructions J1 and J2. Thus, two or more streams of CABAC data may be decoded in parallel.

In some embodiments, the processor may be configured so that the instructions $J_1$ and $J_2$ execute in parallel (or, at least partially in parallel). For example, execution unit 120 may still be accessing memory for the information to update the context state while the second execution unit 130 is operating on the decoder state and the shared state. (See FIGS. 4A, 4B and 5.)

CABAC decoding is defined in section 9.3.3.2 ("Arithmetic Decoding Process") of the ITU-T Recommendation H.264, entitled "Advanced Video Coding for Generic Audiovisual Services", published in May 2003 by the International Telecommunication Union (ITU). That document, hereafter referred to as "the H.264 Specification", is incorporated by reference in its entirety. Section 9.3.3.2 and subsequent sections describe in detail the decoding process for a binary symbol. See FIG. 11 for a flowchart of the decoding process 1100.

Arithmetic coding is based on the principle of recursive subdivision of an initial interval of the real line. Suppose the binary symbols 0 and 1 have respective probabilities of occurrence equal to p(0) and p(1)=1−p(0). An initial code interval having range codIRange is divided into two subintervals of range p(0)*codIRange and (1−p(0))*codIRange, respectively. (The term "range" is used in the sense of "length".) Depending on the current input value, the decoding process 1100 returns the binary decision 0 or 1, and updates the code interval to determine a new code interval. The binary decision is the output of the decoding process and hopefully is equal to the corresponding bit of the original bit stream that was encoded at the corresponding transmitter/encoder.

The decoding process 1100 distinguishes between the most probable symbol (MPS) and the least probable symbol (LPS). The MPS and LPS are complementary: MPS=1−LPS. However, the MPS (and thus, the LPS) changes over time since the probabilities p(0) and p(1) are not the same for every symbol (i.e., bit) of the original bit stream. If p(0) is greater than ½, then MPS=0. Otherwise, MPS=1. The binary decision of the decoding process 1100 depends on the current context, which is identified by the index ctxIdx.

In one embodiment, each context has a set of state data that includes: a bit specifying which symbol (0 or 1) is the MPS, and a 6-bit value representing the occurrence probability of the LPS. Thus, in this embodiment, each context has 128 states, i.e., the product of two states for the MPS and 64 states for the LPS probability. However, it is noted that the specific choice of the MPS and the LPS probability value as the context state data is not essential. More generally, the context state data may include either one of MPS or LPS, and, either one of MPS probability or LPS probability, implying at least four different embodiments for the definition of the context state data. Furthermore, the selection of 64 as the number of probability states is not essential. The principles of the present invention naturally generalize to any number of probability states.

The decoding process 1100 may have the following properties. First, the decoding process may maintain a finite state machine for each of the contexts. For a given context, the finite state machine may control the transitions between states of the corresponding context. As described above, the context state information may include one bit for MPS state and 6 bits for LPS probability. The 6-bit probability state index may map to probability values in a non-linear fashion, e.g., as defined by the following expression: $p_k = \alpha * p_{k-1}$ for k=1, 2, 3, . . . , 63, with $\alpha=(0.01875/0.5)^{1/63}$ and $p_0=0.5$. The index values may map to probability values in a decreasing fashion, with index 0 corresponding to pLPS=0.5, and index 63 corresponding approximately to pLPS=0.0. It is noted that the principles of the present invention naturally generalize to a wide variety of other mappings between probability state index and probability value, including both linear and non-linear mappings.

Second, the range (codIRange) may be quantized to 2 bits (i.e., to one of 4 values).

Third, any syntax elements that are (or are expected to be) sufficiently approximated by a constant probability density function (PDF) may bypass the arithmetic decoding process, and thus, not impact the context FSMs.

Figure 11:
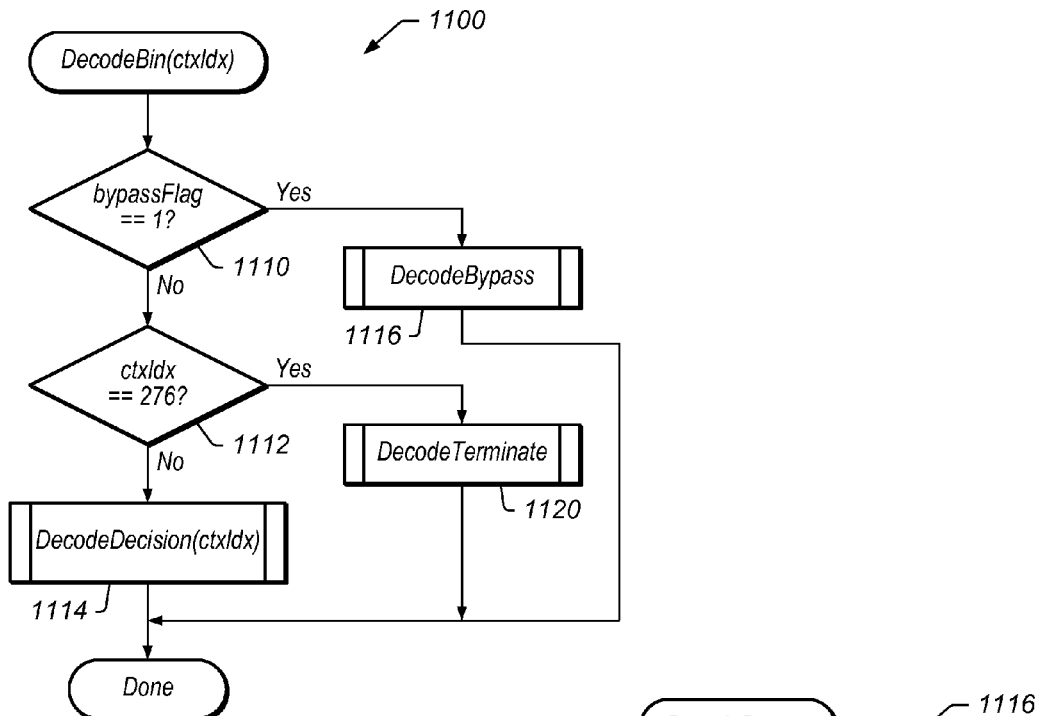
FIG. 11 is a flowchart illustrating the CABAC decoding process.

The input to the decoding process may include a bypassFlag, an index (ctxIdx) into a context-state array, and the variables codIRange and codIOffset. The variables codIRange and codIOffset may be interpreted as the state of the decoding process. As shown in FIG. 11, the decoding process 1100 includes a determination 1110 if the bypassFlag is TRUE. If so, the bypass decoding process 1116 is performed. Otherwise, control passes to operation 1112. In operation 1112, the context index ctxIdx is compared to a termination value. (In one embodiment, the termination value is 276. However, the exact value of the termination index is not essential. Any other value would suffice.) If the context index is equal to the termination value, a termination process 1120 is performed. Otherwise, an arithmetic decoding process 1114 is performed.

In one set of embodiments, a programmable processor may be designed based on an architectural plan that involves organizing the variables involved in the CABAC decoding process, compacting the data structures that hold the state, and parallelizing the computations used in the state transition process. In one embodiment, the state transition computations may be implemented in an MIMD (multiple-instruction multiple-data) fashion.

Bypass Decoding

Figure 12:
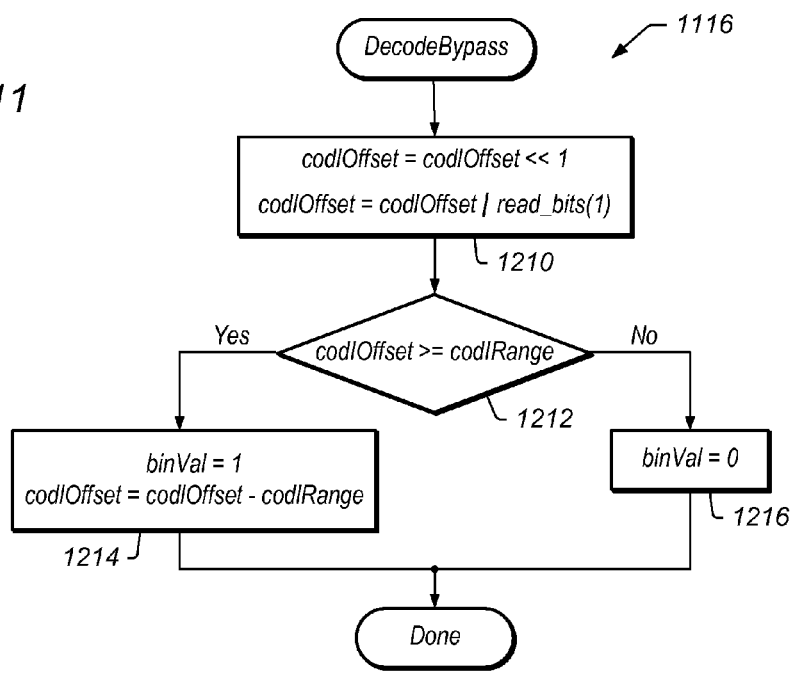
FIG. 12 is a flowchart showing a bypass decoding process.

As described above in connection with FIG. 11, the arithmetic decoding process 1114 may be bypassed, and a bypass decoding process 1116 may be performed if the bypassFlag is equal to one. The bypass decoding process may take bits from the input bitstream and convert them into output data bits as shown in FIG. 12.

At 1210, the internal variable codIOffset may be doubled, and a bit from the input bitstream may be injected (inserted) into the LSB position of that variable. The doubling may be achieved simply by shifting the variable contents one bit position to the left.

At 1212, a test is performed to determine if the variable codIOffset is greater than or equal to codIRange. If that variable is greater than or equal to codIRange, control passes to 1214. Otherwise, control passes to 1216.

At 1214, the binary decision binVal is set equal to one and the variable codIOffset is updated by subtracting codIRange from codIOffset: codIOffset=codIOffset−codIRange.

At 1216, the binary decision is set equal to zero.

The bypass decoding process 1116 is finished after 1214 or after 1216. However, in alternative embodiments, the bypass decoding process may include one or more additional operations.

Termination Decoding

As described above in connection with FIG. 11, the termination decoding process 1120 may be performed if the bypass Flag is set to zero and the context index ctxIdx is equal to the termination value. The termination decoding process 1120 may be performed at the end of a slice. The termination decoding process 1120 may involve the operations shown in FIG. 13.

At 1310, the variable codIRange is decremented by 2.

At 1312, a test is performed to determine if the variable codIOffset is greater than or equal to the variable codIRange. If the test indicates that codIOffset is greater than or equal to codIRange, control passes to 1314. Otherwise, control passes to 1316.

At 1314, the binary decision binVal is set equal to 1. After 1314, the termination decoding process 1120 is finished. However, other embodiments are contemplated where one or additional operations are included after 1314.

At 1316, the binary decision binVal is set equal to 0. At 1318, the variable codIRange is renormalized by shifting the contents of the variable codIRange to the left by the number of leading zeros. After 1 318, the termination decoding process is finished. However, other embodiments are contemplated where one or additional operations are included after 1318.

Arithmetic Decoding Process for Binary Decision

The arithmetic decoding process 1114 may take the value codIOffset and codIRange as input values and return the decision value binVal as output. The arithmetic decoding process 1114 may determine the binary decision binVal by determining if CodIOffset is within the range of the least probable symbol (LPS) or within the range of the most probable symbol (MPS). As an optimization, the second input variable codIRange may be quantized to a two-bit value, and the exact value of the current LPS range (codI-RangeLPS) may be looked up in a table that is accessed using the probability state index and the two-bit quantized range value. The table may represent the quantized PDF for each probability state. In one embodiment, the table is identical to Table 9-33 of the H.264 specification. (While the H.264 specification specifies a 2-bit quantization of the variable codIRange, alternative embodiments may use N-bit quantization with N different from two.)

Figure 14:
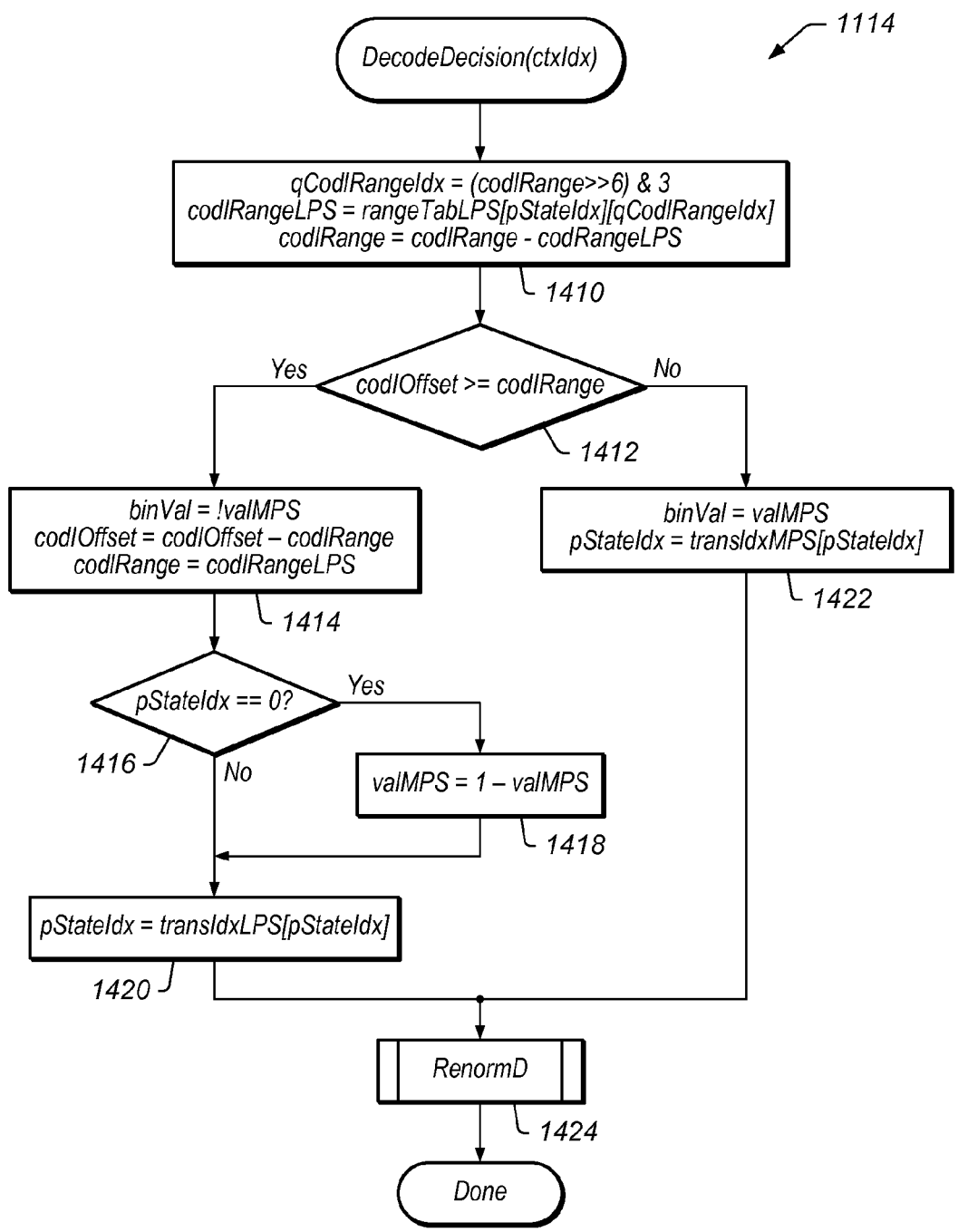
FIG. 14 is a flowchart showing an arithmetic decoding process.

As shown in FIG. 14, the arithmetic decoding process 1114 includes a process of decoding the input data and a process of updating state information (i.e., both system state information and context state information).

At 1410, a quantized range value qCodIRangeIdx is computed based on the variable codIRange, and then, the quantized range value is used to compute codIRangeLPS (a range value for the LPS) and codIRange (a tentative range value for the MPS). The quantized range value qCodI-RangeIdx is computed from the variable codIRange based on the following relation: qCodIRangeIdx=(codIRange>>6) & 0x03. The expression "A>>B" denotes a B bit shift to the right of the contents of operand A. The notation "&" denotes the logical AND operator. The notation "0x03" denotes the number three represented as a 2-digit hexadecimal value.

The quantized range value qCodIRangeIdx and the current probability state index pStateIdx are used to look up the value codIRangeLPS in the table rangeTabLPS. This table lookup is represented by the expression:

codIRangeLPS=rangeTabLPS[pStateIdx][qCodI-
  RangeIdx].

The variable codIRange is updated by subtracting codI-RangeLPS from codIRange: codIRange=codIRange−codI-RangeLPS.

At 1412, a test is performed to determine if the variable codIOffset is greater than or equal to codIRange. If the test determines that codIOffset is greater than or equal to codI-Range, control passes to 1414. Otherwise, control passes to 1422.

At 1414, the binary decision binVal is set equal to the complement of valMPS, i.e., binVal=!valMPS. (The variable valMPS represents the value of the most probable symbol.) Furthermore, the variables codIOffset and codI-Range are updated according to the relations: codIOffset=codIOffset−codIRange, and codIRange=codIRangeLPS.

At 1416, a test is performed to determine if the probability state index pStateIdx is equal to zero. If pStateIdx is determined to be equal to zero, control passes to 1418. Otherwise, control passes to 1420.

At 1418, the variable valMPS is complemented: valMPS=1−valMPS. After 1420, control passes to 1420.

At 1420, an updated value for the probability state index pStateIdx is determined by accessing a first state transition table (transIdxLPS) using the current value of pStateIdx. After 1420, control passes to 1424.

At 1422 (which is performed when test 1412 determines that codIOffset is not greater than or equal to codIRange), the binary decision binVal is set equal to valMPS, and an updated value for the probability state index pStateIdx is determined by accessing a second state transition table (transIdxMPS) using the current value of pStateIdx. After 1422, control passes to 1424.

At 1424, the value codIRange may be normalized. The normalization may be performed according to the following pseudo code:

```
while (codIRange < 0x0100) {
    codIRange = codIRange << 1
    codIOffset = codIOffset << 1
    codIOffset = codIOffset | read_bits(1)
}
```

The operator "|" represents bitwise OR. In other words, if codIRange is less than 0x0100, codIRange and codIOffset are left-shifted by one bit, and a bit from the input bitstream is injected in the LSB position of codIOffset. These operations may be repeated until the condition becomes true.

After 1424, the arithmetic decoding process 1114 is finished. In alternative embodiments, one or one additional processes may be included in the arithmetic decoding process.

In one embodiment, the processor may maintain context state information for a current context (corresponding to ctxIdx). The context state information (ContextState) may include: a bit specifying the current MPS; a current probability state index (CurrentState); a next probability state index (NextStateMPS) under the assumption that the decoded symbols is equal to the MPS; and a next probability state index (NextStateLPS) under the assumption that the decoded symbol is equal to the LPS. (The NextStateMPS and NextStateLPS fields may be populated with data based on Table 9-34 of the H.264 specification.) Thus, if the decoded symbol is equal to the MPS, the probability state transition is given by the expression:

ContextState.CurrentState=ContextState.NextStateMPS.

Otherwise, the probability state transition is given by the expression:

ContextState.CurrentState=ContextState.NextStateLPS.

Figure 13:
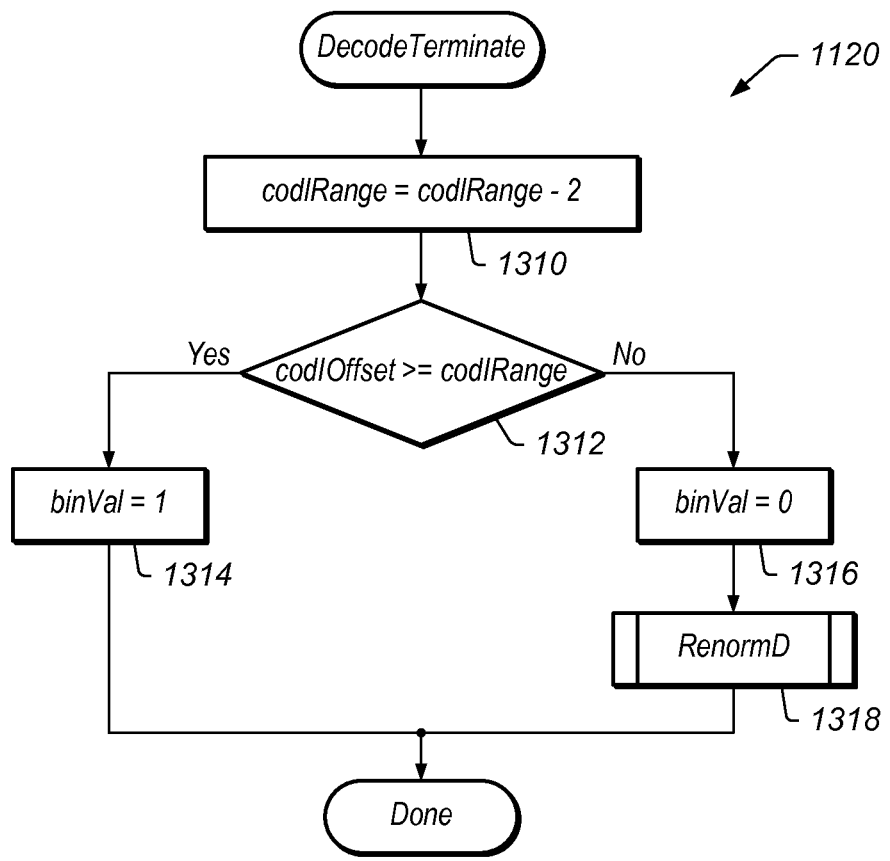
FIG. 13 is a flowchart showing a termination decoding process.
Figure 15:
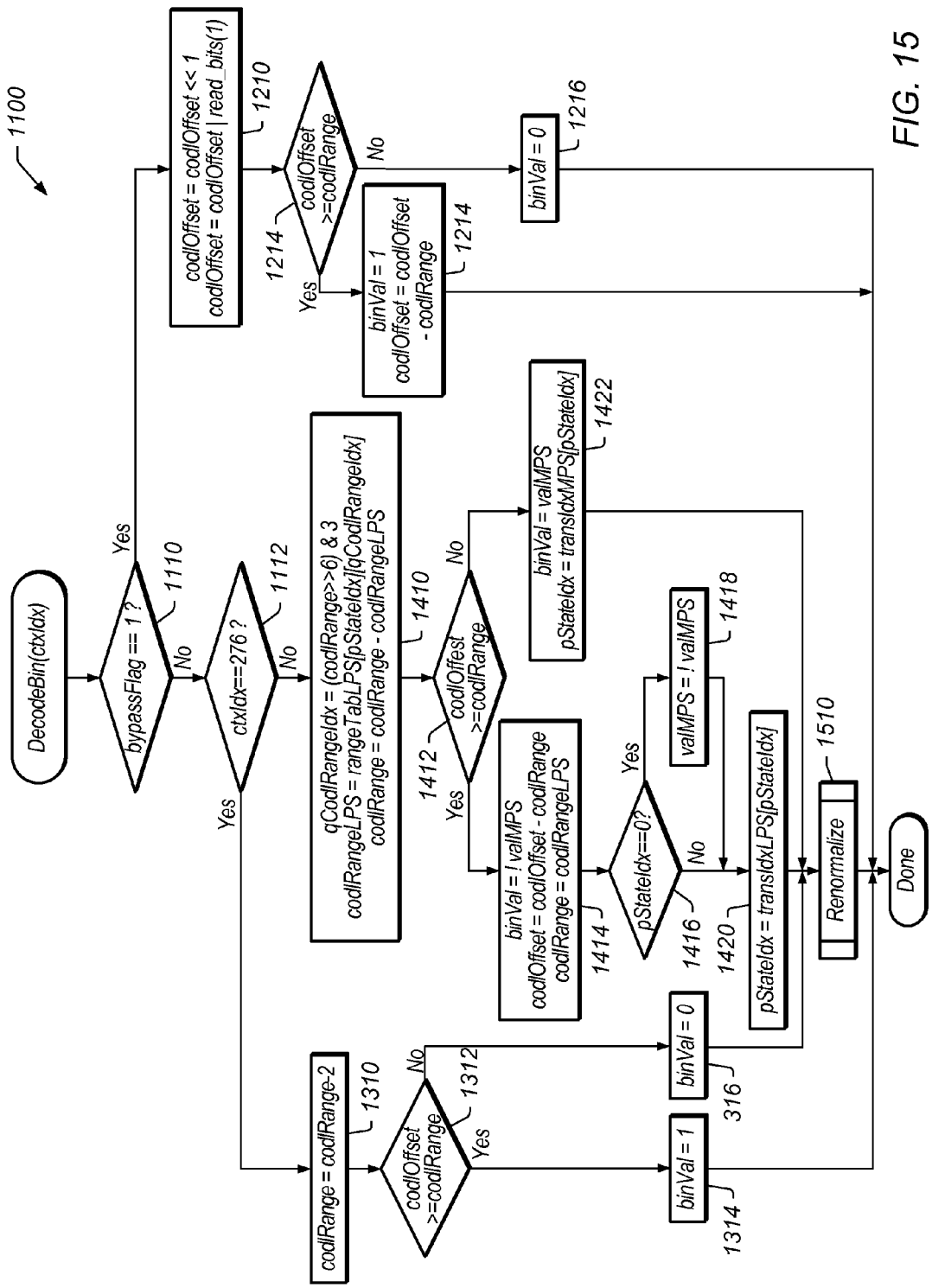
FIG. 15 is a composite flowchart showing the CABAC decoding process as a whole according to one embodiment.

FIG. 15 shows a composite flowchart that results from substituting the flowcharts of FIG. 12-14 into the high-level flowchart of FIG. 11. The composite flowchart reveals that there is substantial commonality in the different branches of the data flow—considering that the state information is shared between the branches. (The normalization operations in FIGS. 13 and 14 have been consolidated into normalization operation 1510.) As described above, the decoding process 1100 uses the flow control bit bypassFlag to control branching to the bypass decoding process (as shown at 1110). If bypassFlag is false, the context index (ctxIdx) is compared to a termination value (as shown at 1112) to decide if the flow branches to the termination decoding process. Conveying all of this information to a single processor instruction as separate parameters may exceed the number of operands supported by many existing processor architectures. Thus, in some embodiments, the information may be consolidated into one or more registers, e.g., xmm registers.

In some embodiments, the context state may be extended to include space for storing an entry from rangeTabLPS (see Table 9-33 of the H.264 specification). Thus, the critical data used to determine the next subinterval may be prefetched.

The context state may be further extended with two entries representing the two probability states that are possible from the current probability state. (These two probability states are referred to as "next probability states".) This allows the processor to perform the calculations required for a state transition after only a single access to the stored context state.

The context state may also include: a bit (TerminationSymbol) that is used to indicate if the given context has context index equal to the termination value, and another bit (bypassFlag) that signals selection of the bypass decoding process.

In one embodiment, bypassFlag is set only in the last context of the context array (context number 399 in embodiments conforming to the H.264 specification). In order to select the bypass decoding process, the context state of the last context is loaded into the processor.

In some embodiments, the processor may be configured to use a state register. The state register may be updated with a single access to the state transition table. This access may be at least partially hidden behind the second phase, which includes the renormalization operation, the data extraction and the determination of the next context state.

In some embodiments, a context table and a state transition table may be defined as specified in the following pseudo code.

```
struct {
    byte rLPS[3:0] ;
    state nextStateMPS;
    state nextStateLPS;
    state currentState;
    bit MPS;
    bit currentState_is_Zero;
    bit previousMPS;
    bit TerminationSymbol;
    bit bypassFlag;
} ContextTable[0:399];
struct {
    byte rLPS[3:0];
    state nextStateMPS;
    state nextStateLPS;
} StateTable[0:63];
```

In one embodiment, the "state" data type is a 6-bit unsigned integer type and is used to define any of the probability state indices: currentState, nextStateMPS, nextStateLPS.

In some embodiments, state information may be stored in the 128-bit wide xmm registers. The xmm registers provide sufficient storage space for multiple heterogeneous data fields. This use of the xmm registers may solve the problem of updating multiple items in an instruction. The architectural definition for the registers may partition the state information into three types: context state, shared state and decoder state.

Figure 16:
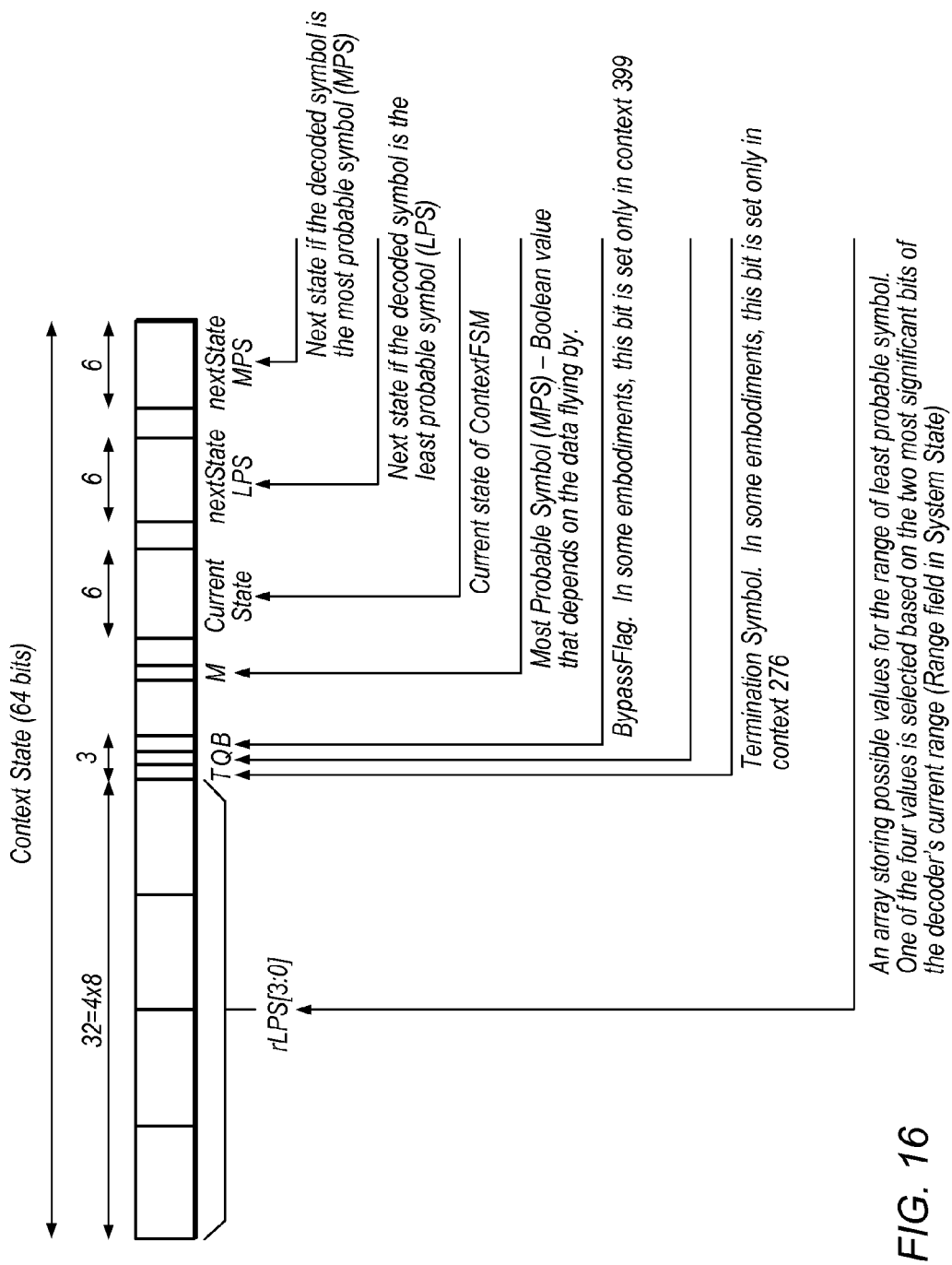
FIG. 16 illustrates one embodiment of the context state.

One embodiment of a structure named "ContextState", for storing context state information, is shown in FIG. 16. ContextState may be 64 bits wide and occupy the lower half of an xmm register. (See also register REG1 of FIG. 3.) As shown in FIG. 16, ContextState resembles a record of ContextTable so that a single 64-bit memory access can move an entire record from/to memory. Assuming a 512-bit cache line, eight of these context records can be packed into a cache line. Other cache line widths are contemplated as well.

Figure 17:
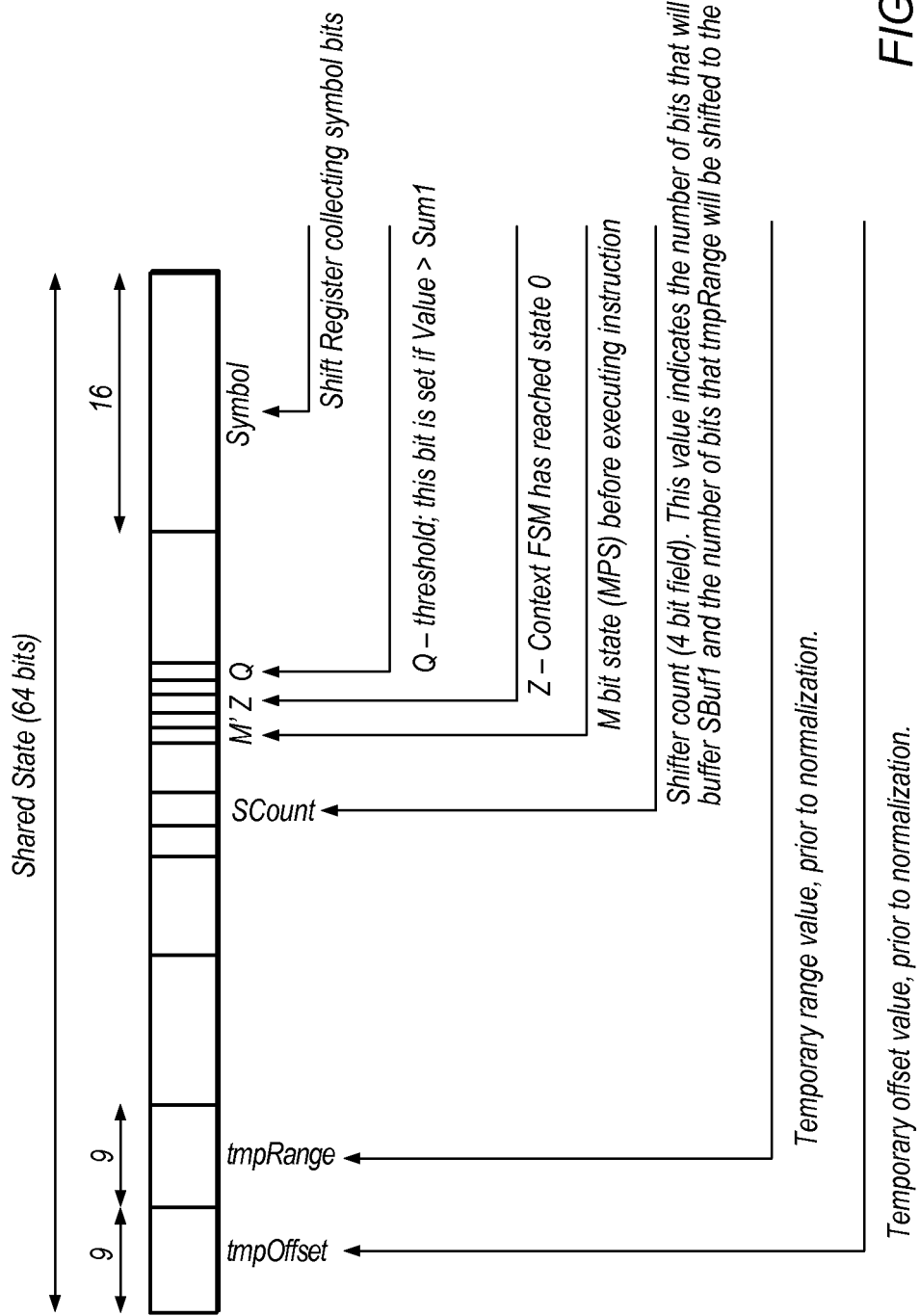
FIG. 17 illustrates one embodiment of the shared state.

One embodiment of a structure named "SharedState" is shown in FIG. 17. SharedState may occupy the upper 64 bits of the same xmm register whose lower half is occupied by ContextState. SharedState holds intermediate results generated by the first phase of the decoder, i.e., by the execution unit 120. These intermediate results may be used by the second phase (i.e., by execution unit 130) or by software during the DecoderBypass operation.

Figure 18:
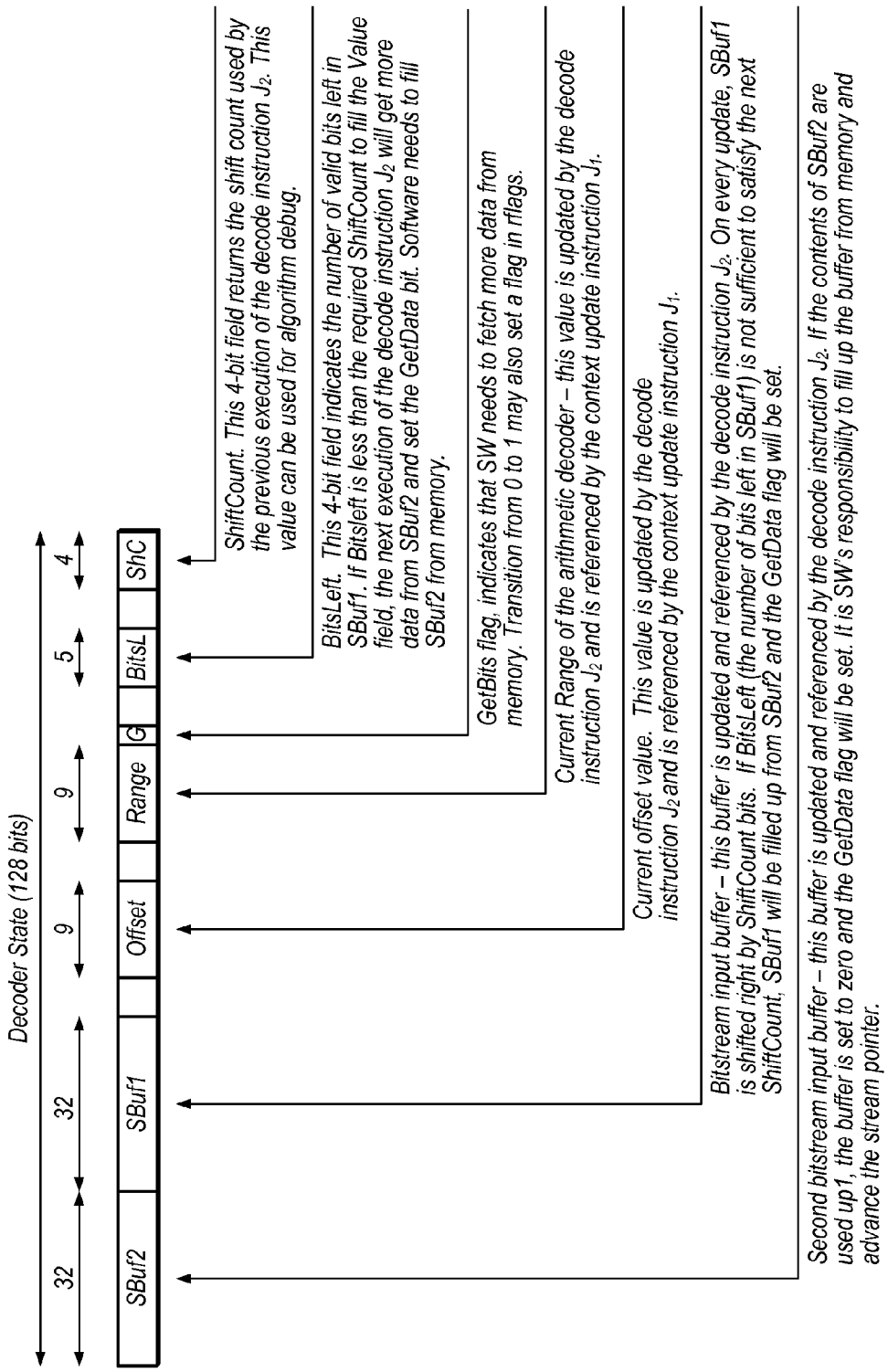
FIG. 18 illustrates one embodiment of the decoder state.

One embodiment of a structure named DecoderState is shown in FIG. 18. DecoderState may be 128 bits wide and occupy another xmm register. The upper 64-bits of the register may serve as a bitstream buffer. Data is automatically extracted from this buffer, and, on underrun of the lower 32 bits, a get_data flag is raised.

The mapping of data items to register fields shown in FIGS. 16-18 is meant as one possible example. A wide variety of other mappings are possible. In one alternative embodiment, the mapping of shared state and context state respectively to the upper and lower halves of the same xmm register is reversed, i.e., shared state occupying the lower half and context state the upper half. Furthermore, the present invention imposes no requirement that context state and shared state be segregated. In one embodiment, they are interleaved (or partially interleaved).

The CABAC binary decode may be implemented using two instructions. The first instruction $J_1$ is responsible for updating the context state and generating intermediate state. The second instruction $J_2$ updates the decoder state, including the data buffer SBuf1.

The first instruction $J_1$ may involve three operands—two source operands (src1 and src2) and one destination operand (dest). For example, according to one possible formatting convention, the first instruction may have the following syntax:

CABACTX dest, src1, src2, mem64

The operands dest, src1 and src2 designate xmm registers with the constraint that dest=src1. The register src1 contains the context state and shared state information. The register src2 contains the decoder state information. The memory address mem64 is a pointer to the base address of the state transition table that is stored in memory. The first instruction $J_1$ may be executed by execution unit 120, e.g., as shown in FIGS. 4A and 4B. According to one embodiment, the first instruction $J_1$ may operate as described by the pseudo code given in FIG. 19.

The second instruction $J_2$ may also include three operands—two source operands (src1 and src2) and one destination operand (dest). For example, the second instruction may have the following syntax:

CABACSX dest, src2, src1

The operands dest, src1 and src2 designate xmm registers with the constraint that dest=src2. The register src2 holds the decoder state information. The lower 64 bits of register src1 hold the context state information; the upper 64 bits provide shared state information. This second instruction $J_2$ may be executed by execution unit 130, e.g., as shown in FIG. 5. According to one embodiment, the second instruction $J_2$ may operate as described by the pseudo code given in FIG. 20.

In one alternative set of embodiments, the processor may be configured to implement the instruction $J_1$ by splitting the 128-bit register that contains the context state and shared state into two 64-bit pieces and executing two ops (e.g., microinstructions) in a way that updates the lower half and the upper independently. Similarly, the second instruction $J_2$ may also to be split into separate parts. The distribution unit 110 may be configured to implement the splitting of instructions $J_1$ and $J_2$ into ops.

Figure 21:
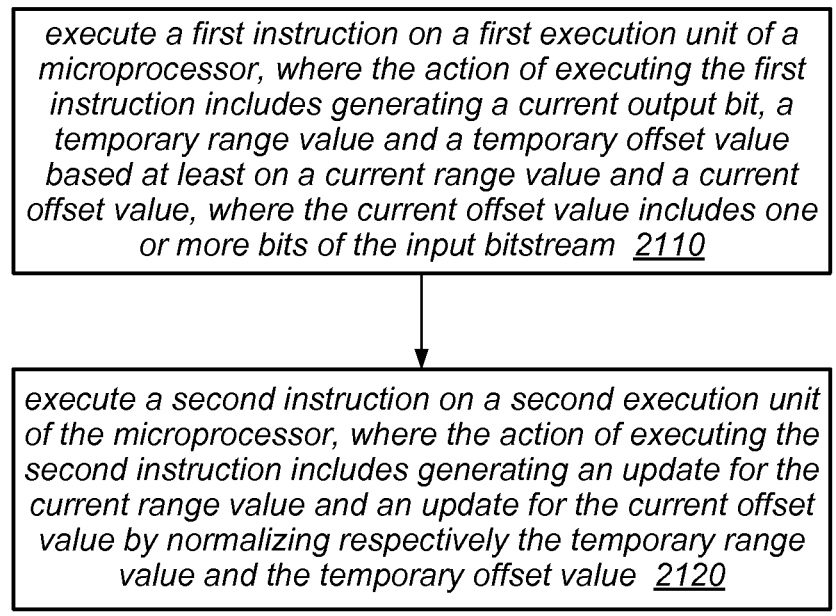
FIG. 21 illustrates one embodiment of a method for performing CABAC decoding.

In one set of embodiments, a method for performing CABAC decoding may involve the following actions, as shown in FIG. 21. The method operates on an input bitstream that has been encoded according to the CABAC algorithm.

At 2110, the method may involve executing a first instruction on a first execution unit of a microprocessor. The action of executing the first instruction may include generating a current output bit, a temporary range value and a temporary offset value based at least on a current range value and a current offset value, where the current offset value includes one or more bits of the input bitstream.

At 2120, the method may also involve executing a second instruction on a second execution unit of the microprocessor. The action of executing the second instruction may include generating an update for the current range value and an update for the current offset value by normalizing respectively the temporary range value and the temporary offset value.

The input bitstream may be decoded by repeatedly performing 2110 and 2120, i.e., by repeatedly executing the first instruction and second instruction. One bit of the original source stream is generated each time the instruction pair is executed.

While much of the above description has focused on embodiments for decoding a bit stream according to the H.264 specification, the inventive principles described herein naturally generalize other sets of data lengths, register lengths, parameter values, array sizes, etc.

The principles disclosed herein may be used to create a pair of execution units for encoding a bitstream according to the CABAC algorithm. The execution units may re-use the layout of the complex state (e.g., as shown in FIG. 3) and implement the logic for the (now different) state transitions and the stream packing. This pair of execution units may be configured to execute two new instructions $K_1$ and $K_2$, respectively.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A digital processor for recovering a source bitstream from an encoded bitstream that has been encoded according to a context adaptive binary arithmetic coding (CABAC) algorithm, the processor comprising:
    a first execution unit configured to generate first execution data by operating on a first register and a second register, and to store the first execution data in the first register, wherein the first execution data includes a current output bit, a temporary range value and a temporary offset value, wherein the current output bit corresponds to a bit of the source bitstream;
    a second execution unit configured to generate second execution data by operating on the first register and the second register and to store the second execution data in the second register, wherein the second execution data includes a normalized range value and a normalized offset value.

2. The digital processor of claim 1, wherein the first register includes data fields for storing the current output bit, the temporary range value, the temporary offset value, a binary most-probable-symbol (MPS) value, a current probability state, two next probability state values, and a set of least-probable-symbol (LPS) range values.

3. The digital processor of claim 2, wherein the first register also includes data fields for storing a bypass control bit, a termination control bit and a zero state indicator, wherein the zero state indicator indicates whether a current context has a probability state index equal to zero.

4. The digital processor of claim 2, wherein first execution data also include an update for the current probability state and an update for the binary MPS value, wherein the first execution unit is configured to initiate a memory access and to store results of the memory access in the first register, wherein the results of the memory access include updates for the two next probability state values and for the set of LPS range values.

5. The digital processor of claim 1 further comprising additional execution units configured to execute instructions of a baseline instruction set, wherein the baseline instruction set includes a set of integer arithmetic operations and a set of floating point arithmetic operations.

6. The digital processor of claim 1, wherein the second register includes data fields for storing a first stream buffer, the normalized range value and the normalized offset value, wherein the first stream buffer stores bits of the encoded bit stream.

7. The digital processor of claim 6, wherein the second execution unit is configured to access a number of bits from the first stream buffer, wherein the normalized offset value includes one or more of said number of accessed bits.

8. The digital processor of claim 6 wherein the second register includes a remaining bit count that indicates a number of valid bits remaining in the first stream buffer.

9. The digital processor of claim 1, wherein the digital processor is part of a computer system.

10. The digital processor of claim 1, wherein the digital processor is part of a mobile device.

11. A method for operating a digital processor in order to recover a source bitstream from an encoded bitstream that has been encoded according to a context adaptive binary arithmetic coding (CABAC) algorithm, the method comprising:
    generate first execution data by operating on a first register and a second register, wherein said generating the first execution data is performed by a first execution unit of the digital processor;
    storing the first execution data in the first register, wherein the first execution data includes a current output bit, a temporary range value and a temporary offset value, wherein the current output bit corresponds to a bit of the source bitstream;
    generating second execution data by operating on the first register and the second register, wherein said generating the second execution data is performed by a second execution unit of the digital processor; and
    storing the second execution data in the second register, wherein the second execution data includes a normalized range value and a normalized offset value.

12. The method 11, wherein the first register includes data fields for storing the current output bit, the temporary range value, the temporary offset value, a binary most-probable-symbol (MPS) value, a current probability state, two next probability state values, and a set of least-probable-symbol (LPS) range values.

13. The method of claim 12, wherein the first register also includes data fields for storing a bypass control bit, a termination control bit and a zero state indicator, wherein the zero state indicator indicates whether a current context has a probability state index equal to zero.

14. The method of claim 12, wherein the first execution data also includes an update for the current probability state and an update for the binary MPS value, wherein the method further comprises:
  initiating a memory access, wherein said initiating the memory access is performed by the first execution unit; and
  storing results of the memory access in the first register, wherein the results of the memory access include updates for the two next probability state values and for the set of LPS range values.

15. The method of claim 11, further comprising:
  executing instructions of a baseline instruction set, wherein the baseline instruction set includes a set of integer arithmetic operations and a set of floating point arithmetic operations, wherein said executing instructions of the baseline instruction set is performed by additional execution units of the digital processor.

16. The method of claim 11, wherein the second register includes data fields for storing a first stream buffer, the normalized range value and the normalized offset value, wherein the first stream buffer stores bits of the encoded bit stream.

17. The method of claim 16, wherein the second execution unit is configured to access a number of bits from the first stream buffer, wherein the normalized offset value includes one or more of said number of accessed bits.

18. The method of claim 16, wherein the second register includes a remaining bit count that indicates a number of valid bits remaining in the first stream buffer.

19. The method of claim 11, wherein the method is performed as part of a software-based video decoding process.

20. The method of claim 19, wherein the software-based video decoding process is performed according to the H.264 standard.

* * * * *